United States Patent [19]

Kadowaki

[11] Patent Number: 5,650,987
[45] Date of Patent: Jul. 22, 1997

[54] OPTICAL DATA RECORDING/ REPRODUCING APPARATUS AND OPTICAL DATA STORAGE MEDIUM FOR USE IN THE SAME

[75] Inventor: Shin-ichi Kadowaki, Hirakata, Japan

[73] Assignee: Matsushita Electric Industrial Co., Ltd., Osaka, Japan

[21] Appl. No.: 371,958

[22] Filed: Jan. 12, 1995

Related U.S. Application Data

[62] Division of Ser. No. 100,457, Jul. 30, 1993, Pat. No. 5,406,545.

[30] Foreign Application Priority Data

| Jul. 31, 1992 | [JP] | Japan | 4-204819 |
| Jul. 31, 1992 | [JP] | Japan | 4-204820 |
| Jul. 31, 1992 | [JP] | Japan | 4-204823 |

[51] Int. Cl.$^6$ ................................ G11B 7/09
[52] U.S. Cl. .................. 369/44.34; 369/44.36; 369/44.41
[58] Field of Search ............... 369/44.34, 44.35, 369/44.36, 44.26, 44.41, 44.29, 44.13, 54, 13; 250/201.5

[56] References Cited

U.S. PATENT DOCUMENTS

| 3,876,841 | 4/1975 | Kramer et al. | 250/201 |
| 3,919,697 | 11/1975 | Walker | 360/77 |
| 4,006,293 | 2/1977 | Bouwhuis et al. | 358/128 |
| 4,023,033 | 5/1977 | Bricot et al. | 250/204 |
| 4,079,247 | 3/1978 | Bricot et al. | 250/204 |
| 4,535,431 | 8/1985 | Bricot et al. | 369/44 |
| 4,553,228 | 11/1985 | Gerard et al. | 369/48 |
| 4,587,644 | 5/1986 | Fujiie | 369/44.36 |
| 5,034,940 | 7/1991 | Saito et al. | 369/44.36 |
| 5,150,345 | 9/1992 | Shikichi et al. | 369/44.36 |
| 5,191,571 | 3/1993 | Fukumoto et al. | 369/44.37 |

FOREIGN PATENT DOCUMENTS

| 0257703 | 3/1988 | European Pat. Off. . |
| 0259913 | 3/1988 | European Pat. Off. . |
| 0409516 | 1/1991 | European Pat. Off. . |
| 0459420 | 12/1991 | European Pat. Off. . |
| 2613865 | 10/1988 | France . |
| 60-143441 | 7/1985 | Japan . |
| 62-159351 | 7/1987 | Japan . |
| 4-38633 | 2/1992 | Japan . |
| 4-38629 | 2/1992 | Japan . |

*Primary Examiner*—Thang V. Tran
*Attorney, Agent, or Firm*—Ratner & Prestia

[57] ABSTRACT

Disclosed is an optical data apparatus for recording and regenerating data on an optical disc, optical card, or the like. There are particularly disclosed an optical data apparatus and an optical data storage medium appropriate for the apparatus capable of detecting a tracking error signal effective particularly for an optical data storage medium on which optical data are recorded at a high density. A pattern is formed on a track and in a position displaced from the track by half cycle of the track in a first servo pattern area, and no pattern is formed in a second servo pattern area. The first servo pattern area and the second servo pattern area are arranged adjacent to each other. The tracking error signal is obtained through multiplication of differential signals obtained at the timing of Sa1 and Sa2. The tracking error signal can be detected up to a spatial cutoff frequency twice as high as the frequency in the conventional case by means of a conventional optical system.

15 Claims, 29 Drawing Sheets

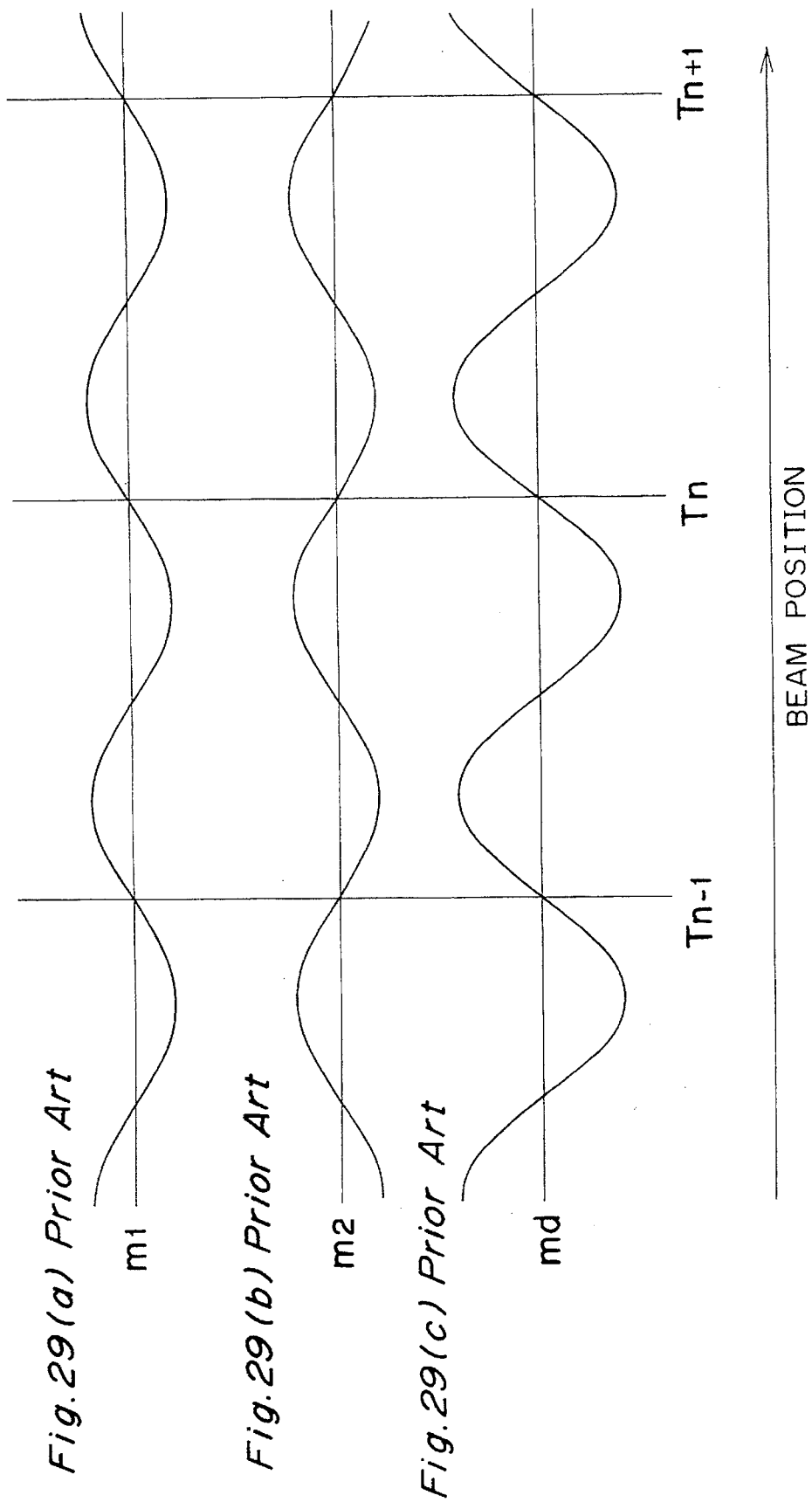

OPTICAL DATA RECORDING/REPRODUCING APPARATUS AND OPTICAL DATA STORAGE MEDIUM FOR USE IN THE SAME

This application is a division of application Ser. No. 08/100,457, filed Jul. 30, 1993, now U.S. Pat. No. 5,406,545.

BACKGROUND OF THE INVENTION

1. Field of the Invention

The present invention relates to an optical data recording and/or reproducing apparatus (referred to as, "optical data apparatus" hereinafter) for recording and/or reproducing data on and/or from an optical data storage medium such as an optical disc, optical card, or the like, and more particularly to an optical data apparatus utilizing an optical data storage medium appropriate for the apparatus capable of detecting a tracking error signal to be effectively used particularly for the optical data storage medium on which optical data is recorded at a high density.

2. Description of the Prior Art

An optical memory technology using an optical disc having a pit pattern as a high-density large-capacity data storage medium has been put into practical use while expanding its applications in the forms of digital audio disc, video disc, document file disc, and data file.

As shown in FIG. 25, a conventional optical data storage medium 23 generally has a spiral or concentric continuous guide groove or pit string 24 formed on the surface thereof. The continuous guide groove or pit string 24 is referred to as "track". In order to correctly read the data on the optical data storage medium 23 or correctly record data on the optical data storage medium 23, focusing and tracking controls must be effected to accurately converge a beam from an optical pickup head on the track to trace the same.

Generally, when an optical pickup head having a light source with a wavelength λ of 780 nm and a convergence lens with a numerical aperture of 0.5 are used, the track pitch on the optical data storage medium 23 is actually 1 to 2 μm. However, since it is difficult to depict the track in exact size, the track 24 on the optical data storage medium 23 is depicted schematically as shown in FIG. 25.

FIG. 26 shows a construction of a conventional optical pickup head. In order to effect the focusing and tracking control, a tracking error signal is detected by the optical pickup head 128 to drive an actuator 192 for controlling the position of a converging lens 108 of the optical pickup head or the position of the optical system in accordance with the tracking error signal. The optical system includes a light source 101 and a beam splitter 103. A representative tracking error signal detection method is the sample servo method. The above-mentioned method is disclosed, for example, in the U.S. Pat. Nos. 3,919,697 and 4,553,228.

FIG. 27 is an enlarged view of a part of a track on an optical data storage medium in accordance with the sample servo method. In the present case, it is assumed that the n-th track is designated by Tn, the (n−2)th track is Tn−2, . . . , and the (n+2)th track is Tn+2. On each of the tracks Tn−2 through Tn+2, there is a cyclical combination of a clock pattern area (referred to as "CPA" in the figures), a servo pattern area (referred to as "SPA" in the figures) and a data area. In the clock pattern area, there is formed a pattern for generating timing signals Sa1 and Sa2 representing a timing for sampling a signal obtained from the servo pattern area.

In the servo pattern area, there is formed a pattern for generating a servo signal (i.e., tracking error signal), where the pattern is formed as staggered apart from the track by a distance of ±p/4 (p: track pitch). In the data area, there is formed a pattern for storing optical data.

FIG. 28 shows a conventional construction of a circuit arrangement for generating a tracking error signal.

Referring to FIGS. 26 and 28, a beam 14 fed by the optical pickup head 128 is converged on the optical data storage medium 23, and then received by a photodetector 13. An electric signal from the photodetector 13 is subjected to a current-to-voltage conversion in an current-to-voltage (I–V) converter 15 to be then transmitted to a phase-locked loop (referred to as, "PLL" hereinafter) circuit 16 and also transmitted to sample and hold circuits 18 and 19.

The PLL circuit 16 generates a clock signal CLK synchronized with a signal obtained from the pattern recorded in the clock pattern area of the optical data storage medium 23. The clock signal CLK is transmitted to a trigger generator circuit 17 to generate timing signals Sa1 and Sa2 representing the timings corresponding to the positions of the patterns P1 and P2 formed in the servo pattern area of the optical data storage medium 23. The sample and hold circuits 18 and 19 sample and hold an output of the I–V converter 15 at the timing of the timing signals Sa1 and Sa2. The signals sampled and held in the sample and hold circuits 18 and 19 are transmitted to a differential operational amplifier 20. After undergoing a differential operation, the resulting signal is sampled and held in a sample and hold circuit 21 to obtain a tracking error signal Tr. The tracking error signal is output from an output terminal 22.

Assuming that the signals held in the sample and hold circuits 18 and 19 are respectively m1 and m2 and the beam from the optical pickup head has a displacement x with respect to the center of the track, the signals m1 and m2 have mutually-antiphase sine waveforms as approximately expressed by the following Equation 1 and Equation 2. The signals m1 and m2 have waveforms as shown in FIGS. 29 (a) and 29 (b).

$$m1 = A \sin(2\pi x/p) + B \qquad \text{Equation 1}$$

$$m2 = -A \sin(2\pi x/p) + B \qquad \text{Equation 2}$$

In Equations 1 and 2, A represents an amplitude, and B represents a DC component.

The signal md sampled and held in the sample and hold circuit 21, i.e., a tracking error signal Tr is expressed by the following Equation 3 and has a waveform as shown in FIG. 29 (c).

$$md = m1 - m2 = 2A \sin(2\pi x/p) \qquad \text{Equation 3}$$

The generated tracking error signal Tr is used as a control signal for driving the actuator which controls the beam from the optical pickup head 128 so that the beam is positioned in the desired place on the optical data storage medium 23.

However, when the track pitch p is reduced in order to record a greater amount of data in an optical data storage medium in the case of the conventional optical data storage medium, the signals m1 and m2 as shown in FIG. 29 are gradually reduced in amplitude. Consequently, the tracking error signal md is reduced in amplitude, which results in a relatively increased amplitude of noise contained in the tracking error signal md. Due to the increase of the noise, the tracking operation becomes unstable. When the track pitch p is further reduced to a level at which the inverse number fp of the track pitch p exceeds the spatial cutoff frequency fc of the optical pickup head, the amplitude of each of the signals m1 and m2 becomes 0, for which the tracking error signal md cannot be obtained at all. In other words, the tracking operation cannot be effected, and therefore the data recorded in the optical data storage medium cannot be reproduced.

Assuming that the wavelength of the light source of the optical pickup head is λ and the numerical aperture of the objective lens is NA, the spatial cutoff frequency fc is given by the formula of 2NA/λ.

When λ=780 nm and NA=0.45, the spatial cutoff frequency fc is:

$$fc=2NA/\lambda=1154/mm$$

The above fact has also resulted in the problem that the tracking error signal cannot be obtained when the track pitch p is not greater than 0.87 μm.

Regarding a tracking error signal detection method and an optical data storage medium capable of detecting a tracking error signal up to a spatial cutoff frequency twice as high as the frequency in the conventional case, the Japanese Patent Laid-Open Unexamined Publications HEI 4-38629 and HEI 4-38633 disclose several examples, however, they have the following problems:

(1) The groove structure of the optical data storage medium is complicated and hardly produced. (See FIG. 7 of the J.P. Laid Open 4-38633)

(2) A plurality of beams must be applied to the optical data storage medium, and therefore the optical system is required to be complicated. (See FIGS. 2 and 5 of the J.P. Laid Open 4-38633)

(3) A great many patterns must be formed in the servo pattern area, and therefore the amount of data allowed to be recorded on the optical data storage medium is significantly reduced. (See FIG. 8 of the J.P. Laid Open 4-38633)

SUMMARY OF THE INVENTION

Accordingly, an essential objective of the present invention is to provide an optical data apparatus utilizing an optical data storage medium appropriate for the apparatus capable of detecting a tracking error signal up to a spatial cutoff frequency twice as high as the frequency in the conventional case still by means of the conventional optical system while solving the problems mentioned above.

In order to solve the aforementioned problems, the present invention provides an optical data storage medium comprising: a data recording area in which data is recorded; a servo pattern area in which a mark or a space for obtaining a tracking error signal is recorded; and a clock pattern area in which a mark or a space for obtaining a clock signal is recorded, where the data to be recorded in a string form in the data recording area is used as a virtual track and the servo pattern area includes a first servo pattern area and a second servo pattern area, and the optical data storage medium conforming to any of the three structures of the following features (1) through (3):

(1) An optical data storage medium, wherein the first servo pattern area has a combination of a mark and a space, the second servo pattern area has a combination of a mark and a space, the first servo pattern area and the second servo pattern area are arranged alternately on a virtual radial line intersecting the track at right angles, the mark in the first servo pattern area and the space in the second servo pattern area are arranged adjacent to each other, while the space in the first servo pattern area and the mark in the second servo pattern area are arranged adjacent to each other.

(2) An optical data storage medium, wherein the first servo pattern area has a combination of a mark and a space, the second servo pattern area has a space, the first servo pattern area and the second servo pattern area are arranged alternately on a virtual radial line intersecting the track at right angles, the mark in the first servo pattern area and the space in the second servo pattern area are arranged adjacent to each other, and the space in the first servo pattern area and the mark in the second servo pattern area are arranged adjacent to each other.

(3) An optical data storage medium, wherein the first servo pattern area has one mark and two spaces, the second servo pattern area has two marks and one space, the first servo pattern area and the second servo pattern area are arranged alternately on a virtual radial line intersecting the track at right angles, the mark in the first servo pattern area and the space in the second servo pattern area are arranged adjacent to each other, and the spaces in the first servo pattern area and the marks in the second servo pattern area are arranged adjacent to each other.

The present invention further provides an optical data apparatus having an optical pickup head, a focus error signal generating section, and a tracking error signal generating section, where the optical pickup head comprises:

a laser beam source which generates a coherent beam or a quasi-monochromatic beam;

a light-converging optical system which receives the beam emitted from the laser beam source to converge the beam on an infinitesimal spot on the optical data storage medium;

beam splitting means which receives the beam reflected and diffracted on the optical data storage medium to split the beam;

a photodetector which receives the beam split by the beam splitting means to output a photoelectric current;

focus control means which controls the focus of the converged beam so that the beam emitted from the laser beam source can be converged on a desired position on the optical data storage medium, the focus control means being controlled based on a signal output from the focus error signal generating section; and tracking control means which controls the position of the converged beam so that the beam emitted from the laser beam source can be converged on the desired position on the optical data storage medium, the tracking control means being controlled based on a signal output from the tracking error signal generating section, and where the focus error signal generating section comprises:

an operational amplifier section which receives an electric signal output from the photodetector to execute an operation for generating a focus error signal and amplify the signal to a level allowing the focus control means of the optical pickup head to be controlled, and where the tracking error signal generating section comprises:

sample and hold means which samples and holds the electric signal output from the photodetector to form not less than two signals sampled at different times;

timing signal generating section which outputs a signal representing the timing of the signal sampling and holding of the sample and hold means, and multiplication means which multiplies the two signals output from the sample and hold means to generate a tracking error signal, the resulting tracking error signal having a frequency twice as high as the frequency of the signal input to the multiplication means.

The above-mentioned optical data apparatus further comprises any of the following components (4) through (7):

(4) Gain control means which controls a gain so that the tracking error signal is able to have a desired amplitude;

(5) DC signal cut-off means which cuts off a DC component contained in the signal input to the multiplication means;

(6) Subtracter circuit which is located at the input side of the multiplication means and operates to reduce the DC component contained in the signal input to the multiplication means by subtracting the DC component from the signal input to the multiplication means;

(7) Subtracter circuit which is arranged at the output side of the multiplication means and operates to reduce a DC component contained in the signal output from the multiplication means or a component having the same frequency as the frequency of the signal input to a multiplication means by subtracting from the signal output from the multiplication means the DC component or the component having the same frequency as the frequency of the signal input to the multiplication means.

In the optical data apparatus which obtains the tracking error signal by means of the aforementioned optical data storage medium, assuming that the track pitch on the optical data storage medium is pt, the cycle of the signal input to the multiplication means is the double of the cycle pt, and the cycle of the signal output from the multiplication means is pt, where the signal output from the multiplication means is used as the tracking error signal.

It is well known as a definition in the field of physics that cycle is the reciprocal of frequency. Therefore, the fact that cycle is doubled has the meaning that the frequency is reduced by half.

According to the present invention, the cycle of the signal necessary for obtaining the tracking error signal having the cycle pt is the double of pt. In other words, the tracking error signal can be obtained using a signal having a frequency being one half of the frequency given by the track pitch. Therefore, the present invention can provide an optical data apparatus and an optical data storage medium appropriate for the apparatus capable of detecting the tracking error signal even when the track pitch is reduced to one half of the track pitch in the conventional case.

By incorporating any of the components of the aforementioned items (4) through (7) into the optical data apparatus, a tracking error signal containing reduced offset and noise can be obtained.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 29(a), 29(b) and 29(c) are charts each showing the principle of signal detection by means of a conventional optical data storage medium.

DETAILED DESCRIPTION OF THE PREFERRED EMBODIMENTS

The following describes optical data storage media for use in an optical data apparatus in accordance with several embodiments of the present invention with reference to FIGS. 1 through 24. It is to be noted that like numerals refer to like parts in the embodiments when the same components can be used.

First Embodiment

Figure 1:
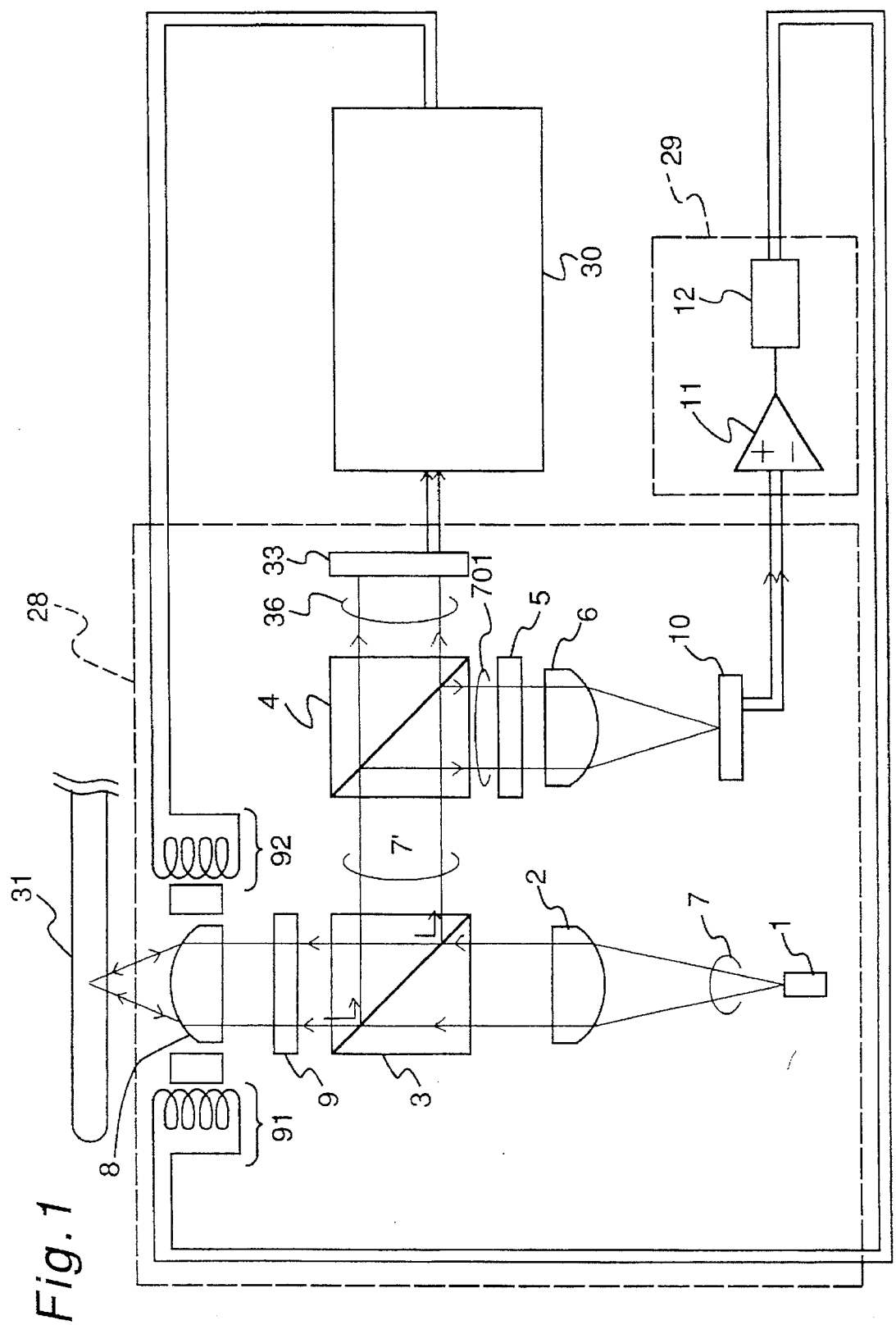
FIG. 1 is a schematic diagram of an optical data apparatus in accordance with an embodiment of the present invention.

FIG. 1 shows a construction of an optical data apparatus in accordance with a first embodiment of the present invention, in which optical data is recorded on each track of an optical data storage medium and the data recorded on each track is reproduced. The optical data apparatus includes an optical pickup head 28 for optically recording and/or reproducing data. The optical data apparatus further includes a focus error signal generator 29 for generating a focus control signal for controlling the position of an objective lens 8 by means of an actuator 91 so that a light beam emitted from a light source 1 in the optical pickup head 28 is focused on a desired track on an optical data storage medium 31 for storing data. The optical data apparatus further includes a tracking error signal generator 30 for generating a signal for controlling the position of the objective lens 8 by means of an actuator 92 so that the light beam emitted from the optical pickup head 28 scans the desired track on the optical data storage medium 31. The optical data storage medium 31 can be easily replaced.

A coherent or quasi-monochromatic light beam is used, which is generated by means of the light source 1. A semiconductor laser is appropriately used as the light source 1. A linearly-polarized light beam 7 emitted from the light source 1 is passed through a collimator lens 2 to be formed into parallel beams. After passing through a polarization beam splitter 3, the beam is passed through a quarter-λ plate 9 to be a circularly-polarized beam, which the beam passes through the objective lens 8 to be converged on the optical data storage medium 31. The polarization beam splitter 3 has a characteristic of transmitting 100% of a beam having the same polarization as that of the beam 7 emitted from the light source 1 and reflecting 100% of a beam having a polarization direction perpendicular to that of the beam 7 emitted from the light source 1. Therefore, the beam 7 which is emitted from the light source 1 and directed to the optical data storage medium 31 is not reflected at all to pass through the polarization beam splitter 3.

The construction of the optical data storage medium 31 will be discussed in detail hereinafter. The converged beam 7 is reflected and diffracted on the optical data storage medium 31. The reflected and diffracted beam 7' returns passing through the objective lens 8 again and then through the quarter-λ plate 9 to be a linearly-polarized beam having a polarization direction at an angle of 90° with respect to the original beam 7 emitted from the light source 1 and then enters to the polarization beam splitter 3. The beam 7' which entered to the beam splitter 3 is totally reflected by the beam splitter 3 and the reflected beam 7' enters to a second beam splitter 4. The second beam splitter 4 splits the beam 7' into two beams 36 and 701. The beam splitter 4 has a characteristic of reflecting 50% and transmitting 50% in intensity of the incident beam, not depending on the polarization direction of the incident beam. The beam 701 reflected by the beam splitter 4 is guided to a cylindrical lens 5. The beam 701 which has passed through the cylindrical lens 5 is formed into a beam having an astigmatism, and then converged by a convergent lens 6 to be received by a photodetector 10.

Meanwhile, the beam 36 which has passed through the beam splitter 4 is received by another photodetector 33. A photo-electric converted signal output from the photodetector 33 is subjected to an appropriate calculation for obtaining a tracking error signal.

Another photo-electric converted signal output from the photodetector 10 is subjected to an appropriate calculation for obtaining a focus error signal. In the present embodiment, the focus error signal is obtained by an astigmatism method. The astigmatism method for obtaining the focus error signal is conventionally well known as disclosed in the U.S. Pat. Nos. 4,023,033, 4,079,247, and therefore no detailed description is provided therefor herein. The photodetector 10 has four light-receiving areas. The electric signal output from the photodetector 10 is subjected to a differential calculation by means of a differential operational unit 11 in the focus error signal generator 29. A signal output from the differential operational unit 11 is amplified by means of an amplifier 12 and the amplified signal is supplied to the actuator 91 for the focus control.

Figure 2:
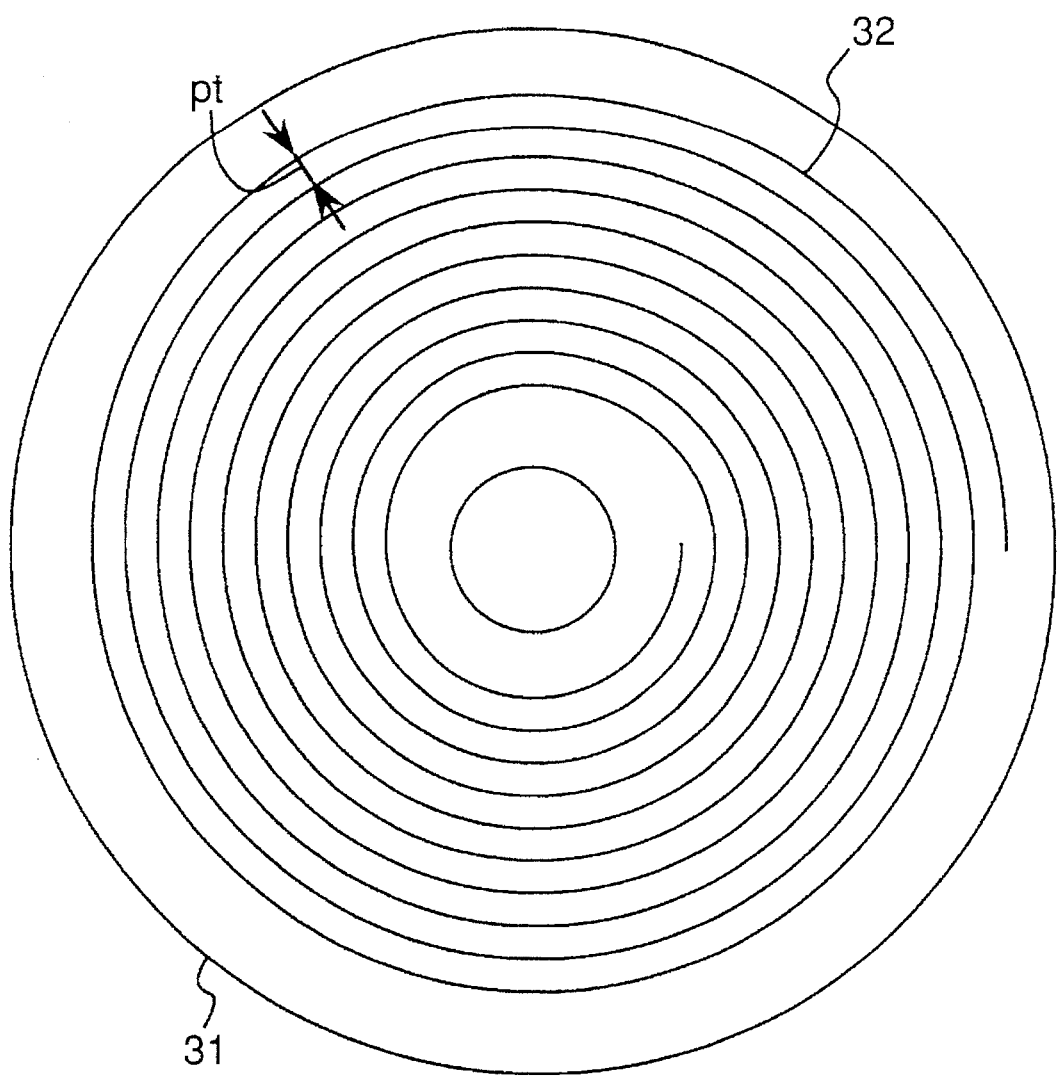
FIG. 2 is a schematic diagram of an optical data storage medium in accordance with an embodiment of the present invention.

FIG. 2 shows a schematic diagram of the optical data storage medium 31 of the present invention.

The optical data storage medium 31 has a spiral pit string 32 serving as a track. The actual track pitch pt is about 0.5 to 2 μm. However, since it is difficult to depict the track in exact size, the track 32 formed on the optical data storage medium 31 is depicted schematically.

Figure 3:
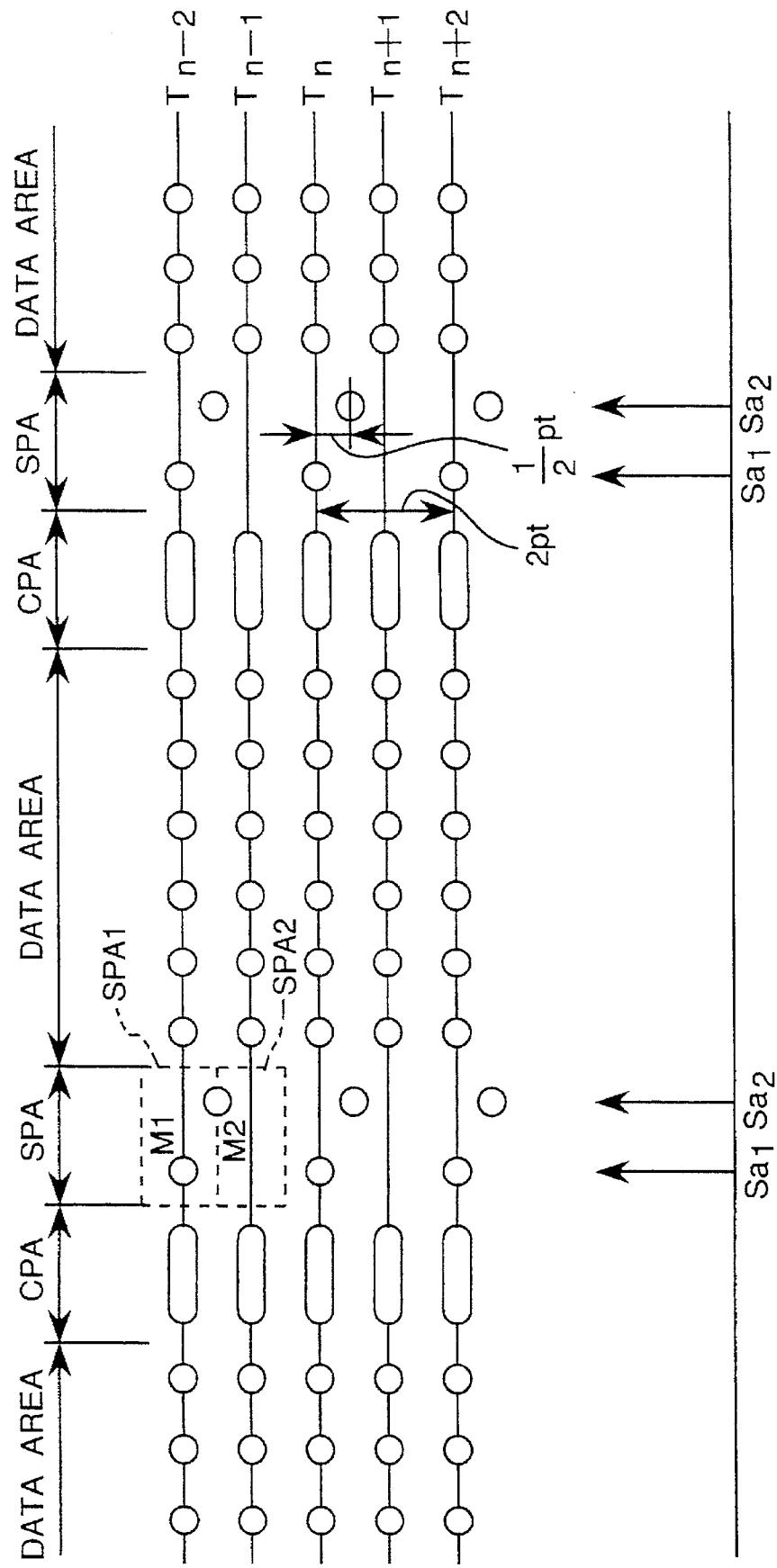
FIG. 3 is a schematic diagram of tracks on an optical data storage medium of the present invention.

FIG. 3 shows a partially enlarged view of the track 32 formed on the optical data storage medium 31 shown in FIG. 2. In the present embodiment, it is assumed that the n-th track is designated by Tn, the (n−2)th track is Tn−2, . . . , and the (n+2)th track is Tn+2. On each of the tracks, there is formed a cyclical combination of a clock pattern area, a servo pattern area, and a data area having a pattern formed for storing data. In the clock pattern area, there is formed a pattern for generating timing signals Sa1 and Sa2 each representing a timing for sampling a signal obtained from the servo pattern area, while in the servo pattern area there is formed a pattern for generating a servo signal.

There are two patterns to be recorded in the servo pattern area. The first pattern belongs to an area which is referred to as the first servo pattern area SPA1, while the second pattern belongs and area which is referred to as the second servo pattern area SPA2. In the first servo pattern area SPA1, there are formed a pair of marks M1 and M2, where the mark M1 is arranged on the track while the mark M2 is arranged at a position apart from the track by a distance of pt/2. Each mark may be formed by a general pit-shaped pattern or a pattern having its reflectance, Kerr angle of rotation, or the like different from those of its periphery. The second servo pattern area SPA2 has no pattern mark formed. In other words, the second servo pattern area SPA2 has a mirror surface portion. The mirror surface portion is defined as a "space". In the present invention, it is to be noted here that the term of "pattern" means a mark or a space.

The first servo pattern area SPA1 and the second servo pattern area SPA2 are arranged alternately in a direction perpendicular to the track. In more detail, the first servo pattern area SPA1 corresponding to the track line Tn–2 is perpendicularly adjacent to the second servo pattern area SPA2 corresponding to the track line Tn–1, while the second servo pattern area SPA2 is adjacent to the next first servo pattern area corresponding to the track line Tn. Furthermore, according to the present embodiment, same servo pattern areas are formed on an identical track. Therefore, the servo pattern area formed on the tracks Tn and Tn±2 is the first servo pattern area, while the servo pattern area formed on the track Tn±1 is the second servo pattern area.

Figure 4:
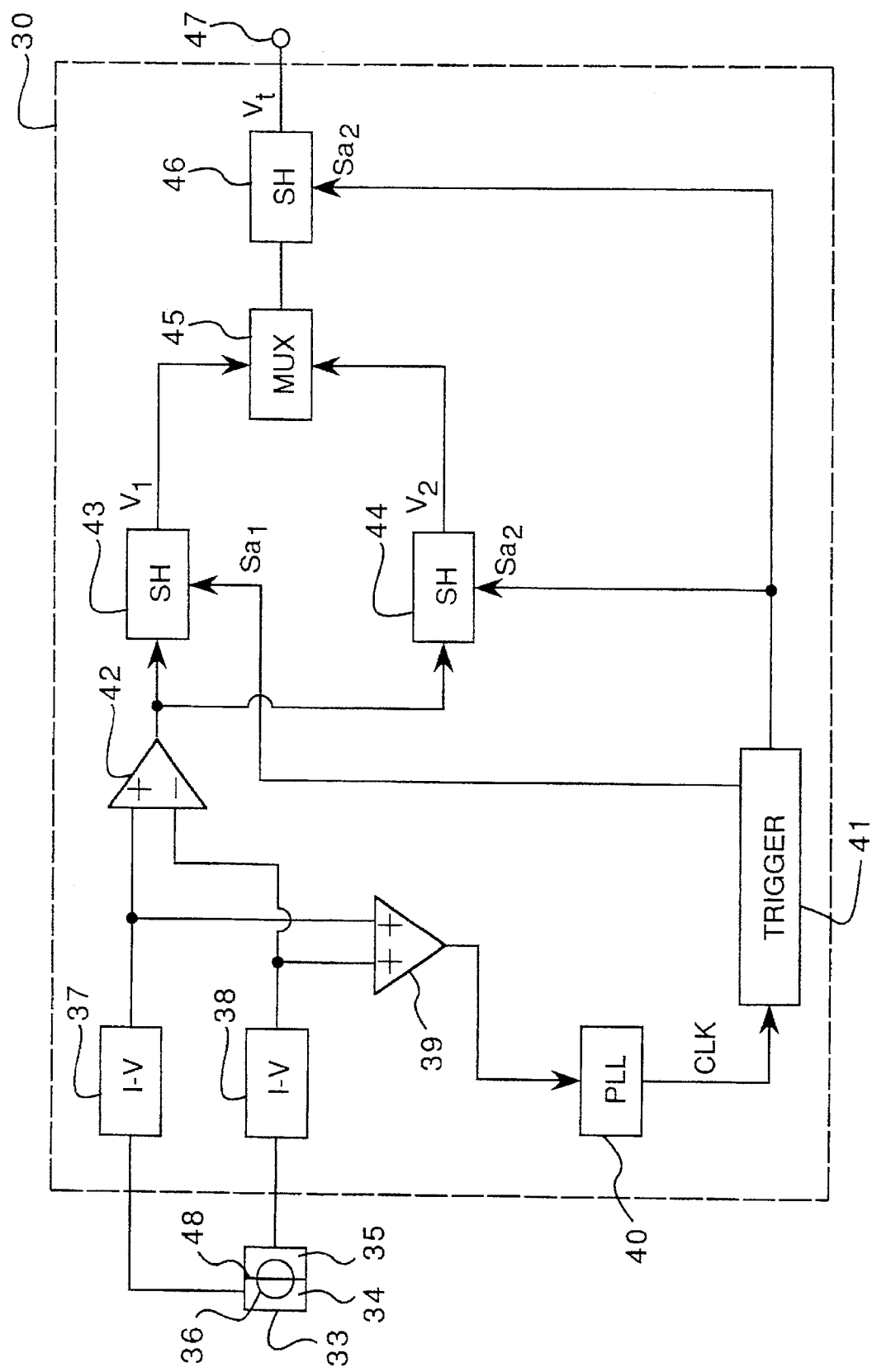
FIG. 4 is a block diagram of a circuit for detecting a tracking error signal by means of an optical data storage medium of the present invention.

FIG. 4 shows the construction of the tracking error signal generator 30. The beam 36 passed through the beam splitter 4 in the optical pickup head 28 is received by the photodetector 33. The photodetector 33 is composed of two light-detecting sections 34 and 35 which are divided by a division line 48. An reflected image of a track (direction of the track) contained in the beam 36 is aligned with the division line 48 which divides the two light-detecting sections 34 and 35 of the photodetector 33.

Electric signals output from the light-detecting sections 34 and 35 are subjected to a current-to-voltage conversion respectively in I–V converter units 37 and 38. Outputs of the I–V converter circuits 37 and 38 are transmitted to a differential operational unit 42 and an adder 39. The signals added together in the adder 39 is input to a PLL circuit 40. The PLL circuit 40 generates a clock signal CLK synchronized with a signal obtained from the pattern recorded in the clock pattern area of the optical data storage medium 31. The clock signal CLK is transmitted to a trigger generator 41 which generates timing signals Sa1 and Sa2 each representing a timing corresponding to the position of the pattern formed in the servo pattern area of the optical data storage medium 31.

Sample and hold circuits 43 and 44 sample and hold the output signal of the differential operational unit 42 at the timing of the timing signals Sa1 and Sa2 respectively. The signals v1 and v2 sampled and held in the sample and hold circuits 43 and 44 are transmitted to a multiplier (MUX) 45 to undergo multiplication, and the resulting signal v3 is sampled and held in a sample and hold circuit 46 which generates a tracking error signal vt. The tracking error signal vt is output through an output terminal 47.

Assuming that the signals sampled and held in the sample and hold circuits 43 and 44 are v1 and v2 respectively and the beam from the optical pickup head has a displacement x with respect to the center of the track, the signals v1 and v2 have sine waveforms which are mutually different in phase by π/2 as approximately expressed by the following Equations 4 and 5. The signals v1 and v2 can be illustrated as in FIGS. 5 (a) and 5 (b).

$$v1 = A_1 \sin(2\pi x/pt) \quad \text{Equation 4}$$

$$v2 = A_1 \cos(2\pi x/pt) = A_1 \sin(2\pi x/pt + \pi/2) \quad \text{Equation 5}$$

In Equations 4 and 5, $A_1$ represents an amplitude. The tracking error signal vt can be expressed by the following Equation 6 and illustrated as in FIG. 5 (c).

$$vt = v1 \cdot v2 = A_1^2/2 \cdot \sin(4\pi x/pt) \quad \text{Equation 6}$$

Figure 5:
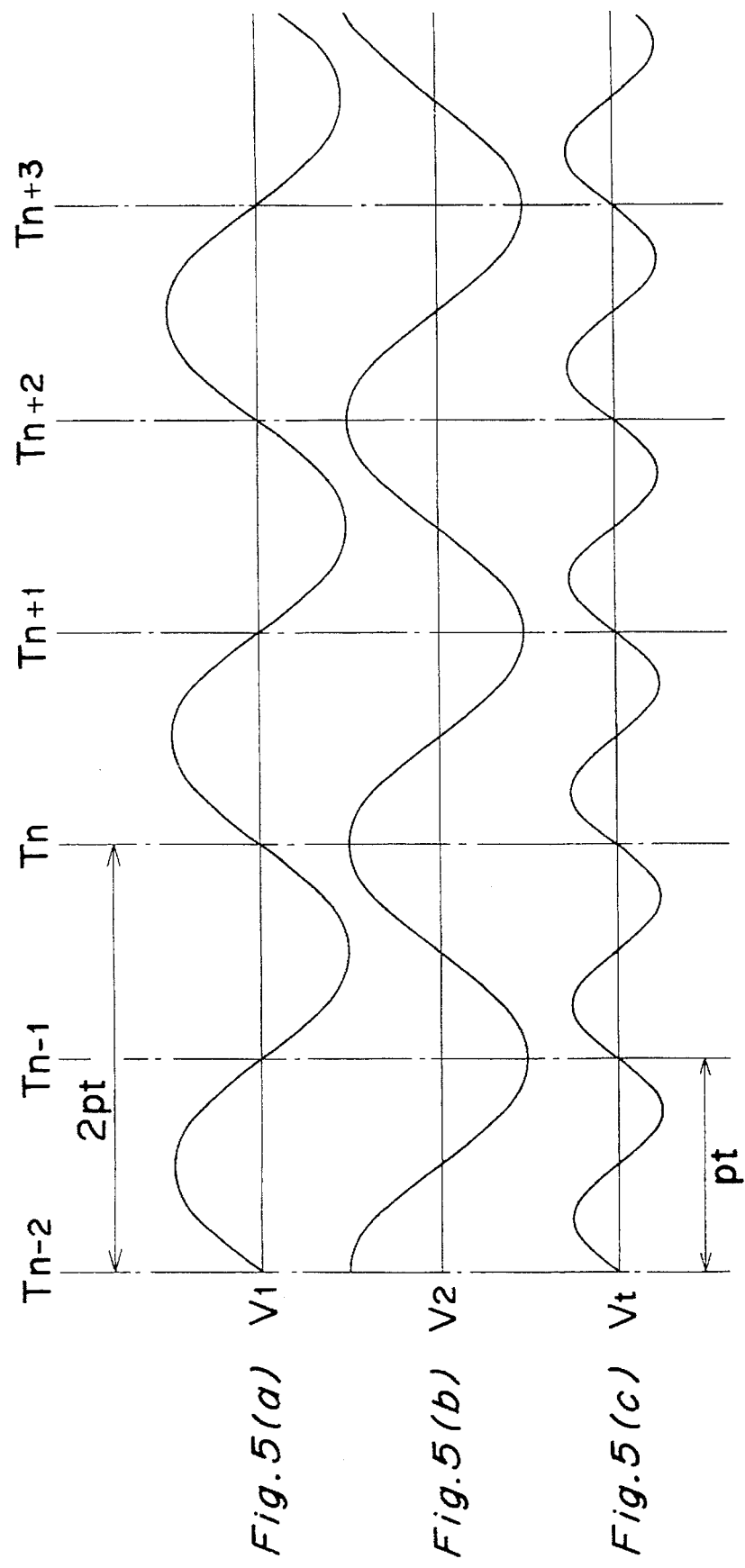
FIGS. 5(a), 5(b) and 5(c) are charts each showing the principle of signal detection by means of an optical data storage medium of the present invention.

The tracking error signal vt has a spatial frequency twice as high as the frequency of each of the signals v1 and v2 as shown in FIG. 5 (c). Conventionally, the frequency of a signal for obtaining a tracking error signal has been conventionally the same as the frequency of the tracking error signal. However, when the optical data storage medium 31 and the tracking error signal detection method of the present invention are used, the frequency of each of the signals v1 and v2 for obtaining the tracking error signal is a half of the frequency of the tracking error signal. The above fact means that the tracking error signal can be obtained when that the optical data storage medium 31 and the tracking error signal detection method of the present invention are used even in the case where the track pitch is reduced to such a degree that the tracking error signal cannot be obtained by the conventional tracking error signal detection method. When the optical data storage medium 31 and the tracking error signal detection method of the present invention are used, the tracking error signal can be obtained even when the track pitch is reduced to a degree of a half of the conventional track pitch. In other words, according to the present invention, data being twice as much as data in the conventional case can be recorded on one optical data storage medium.

According to the present embodiment, the tracking error signal can be obtained by means of a simple optical system for converging one beam on an optical data storage medium, which leads to provision of an inexpensive optical data apparatus.

Although the track 32 is formed in a spiral pit string form on the optical data storage medium 31 in the present embodiment, the spiral form is not always required. For example, the track may be formed in a concentric form without any problem. Moreover, although the second servo pattern area has a mirror surface portion, the tracking error signal can be obtained without any particular problem so long as the second servo pattern area has a pattern having a reflectance or a rate of change in phase different from those of the pattern formed in the first servo pattern area. The number of servo pattern areas formed on one round of a track depends on the quantity of eccentricity and the track pitch of each disc. Approximately 100 to 3,000 servo pattern areas are sufficient for achieving a practically excellent tracking servo characteristic without any problem.

Second Embodiment

In the second embodiment, the same optical data apparatus as that of the first embodiment shown in FIG. 1 can be used. What differs from the first embodiment is the fact that the servo pattern area on the optical data storage medium 31 has a varied construction. The other components can be used in the same manner as in the first embodiment.

Figure 6:
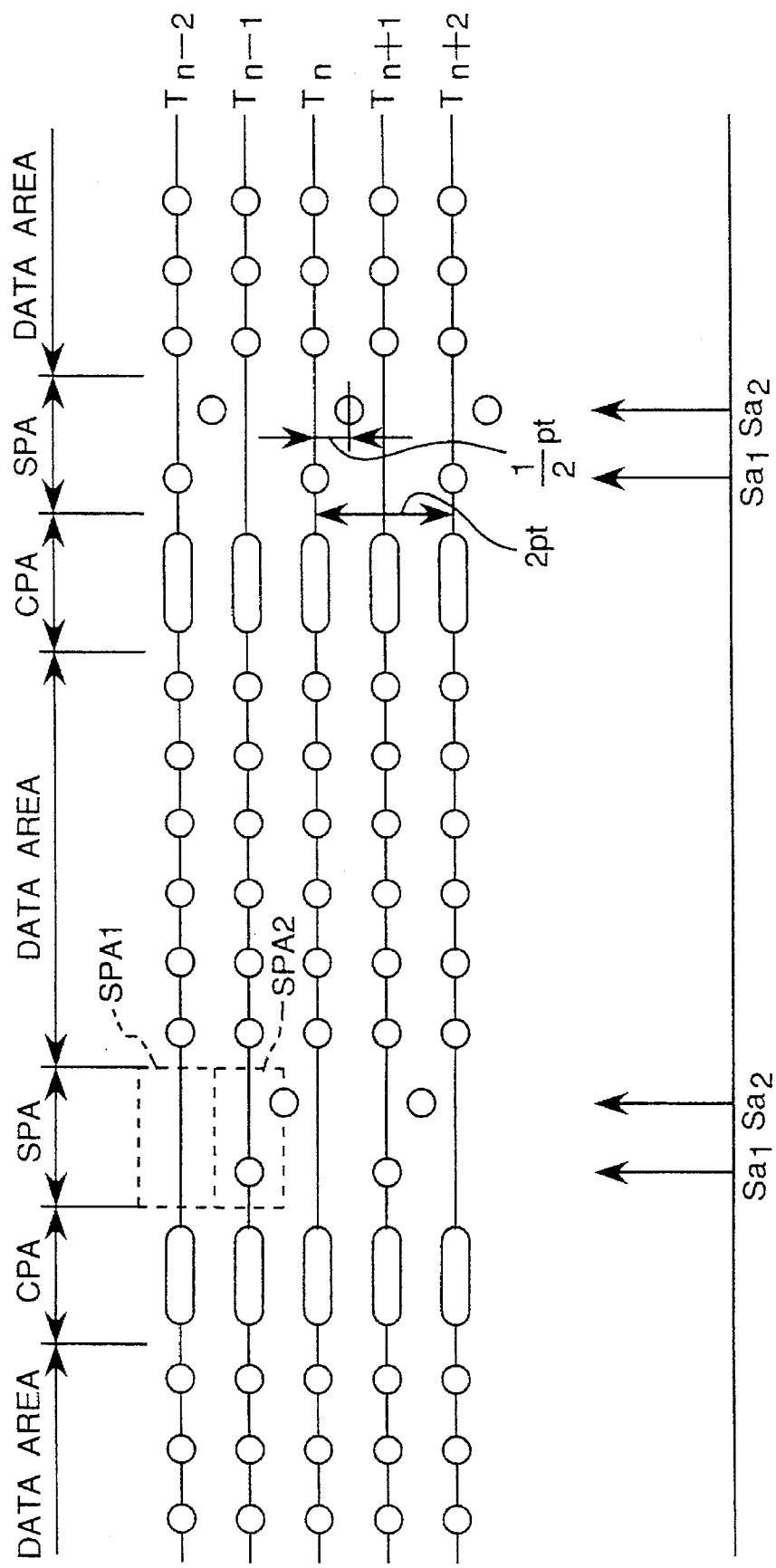
FIG. 6 is a schematic diagram of tracks on an optical data storage medium in accordance with another embodiment of the present invention.

FIG. 6 shows a schematic diagram of tracks formed on the optical data storage medium 31. Although same servo pattern areas are formed on an identical track in the first embodiment, two types of servo pattern areas are alternately arranged in the servo pattern areas on an identical track in the second embodiment. In the vertical direction perpendicular to the direction of the track lines, since different servo pattern areas are arranged adjacent to each other in the same manner as the optical data storage medium in the first embodiment, a tracking error signal can be detected even when the track pitch is reduced to a half of the conventional track pitch.

According to the optical data storage medium of the present embodiment, a first servo pattern area and a second servo pattern area are arranged alternately on an identical track. By virtue of the above arrangement, even when a pattern to be recorded in a position apart from the track by a distance of pt/2 in the servo pattern area is recorded practically in a position slightly displaced from the position of pt/2, a possible offset taking place for the above reason is canceled to allow the beam from the optical pickup head to be controlled more stably as compared with the performance of the first embodiment.

Third Embodiment

In the third embodiment, substantially the same optical data apparatus as that of the first embodiment shown in FIG. 1 can be used. What differs from the first embodiment is in the fact that the servo pattern area on the optical data storage medium 31 has a varied construction, that a photodetector 51 is provided in place for the photodetector 33, and that the tracking error signal generator 30 has a varied construction. The other components can be used utterly in the same manner as in the first embodiment.

Figure 7:
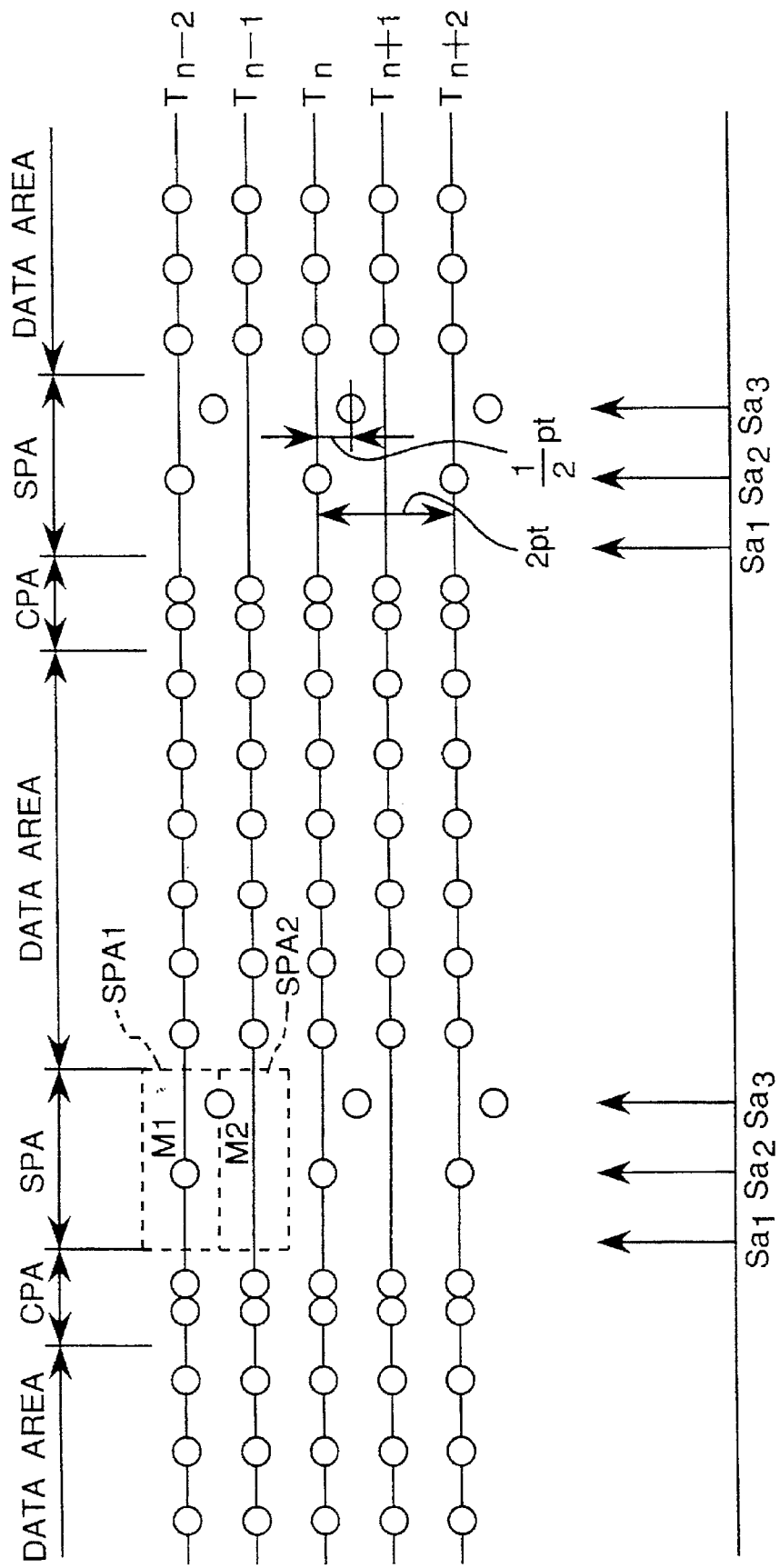
FIG. 7 is a schematic diagram of tracks on an optical data storage medium in accordance with another embodiment of the present invention.

FIG. 7 shows a schematic arrangement of tracks formed on the optical data storage medium 31. The optical data storage medium is allowed to have the same spiral or concentric track construction as that of the optical data storage medium 31 of the first embodiment. In the same manner as in the first embodiment, it is assumed that the n-th track is Tn, the (n−2)th track is Tn−2, . . . , and the (n+2)th track is Tn+2 in the present embodiment. On each of the tracks Tn−2 through Tn+2, there is arranged a cyclical combination of a clock pattern area having a pattern formed for generating timing signals Sa1, Sa2 and Sa3 each representing a timing for sampling a signal obtained from a servo pattern area, the servo pattern area having a pattern formed for generating a servo signal, and a data area having a pattern formed for storing data.

There are two patterns to be recorded in the servo pattern area. The first pattern belongs to an area which is referred to as the first servo pattern area SPA1, while the second pattern belongs to an area which is referred to as the second servo pattern area SPA2. In the first servo pattern area SPA1, there are formed a pair of marks M1 and M2, where the mark M1 is formed on the track and the mark M2 is formed in a position apart from the track by a distance of pt/2. The first servo pattern area further has a space. The second servo pattern area has no pattern mark formed. In other words, the second servo pattern area has only a space. In more detail, the first servo pattern area is vertically adjacent to the second servo pattern area, while the second servo pattern area is vertically adjacent to the next first servo pattern area in the direction traversing the track lines.

Figure 8:
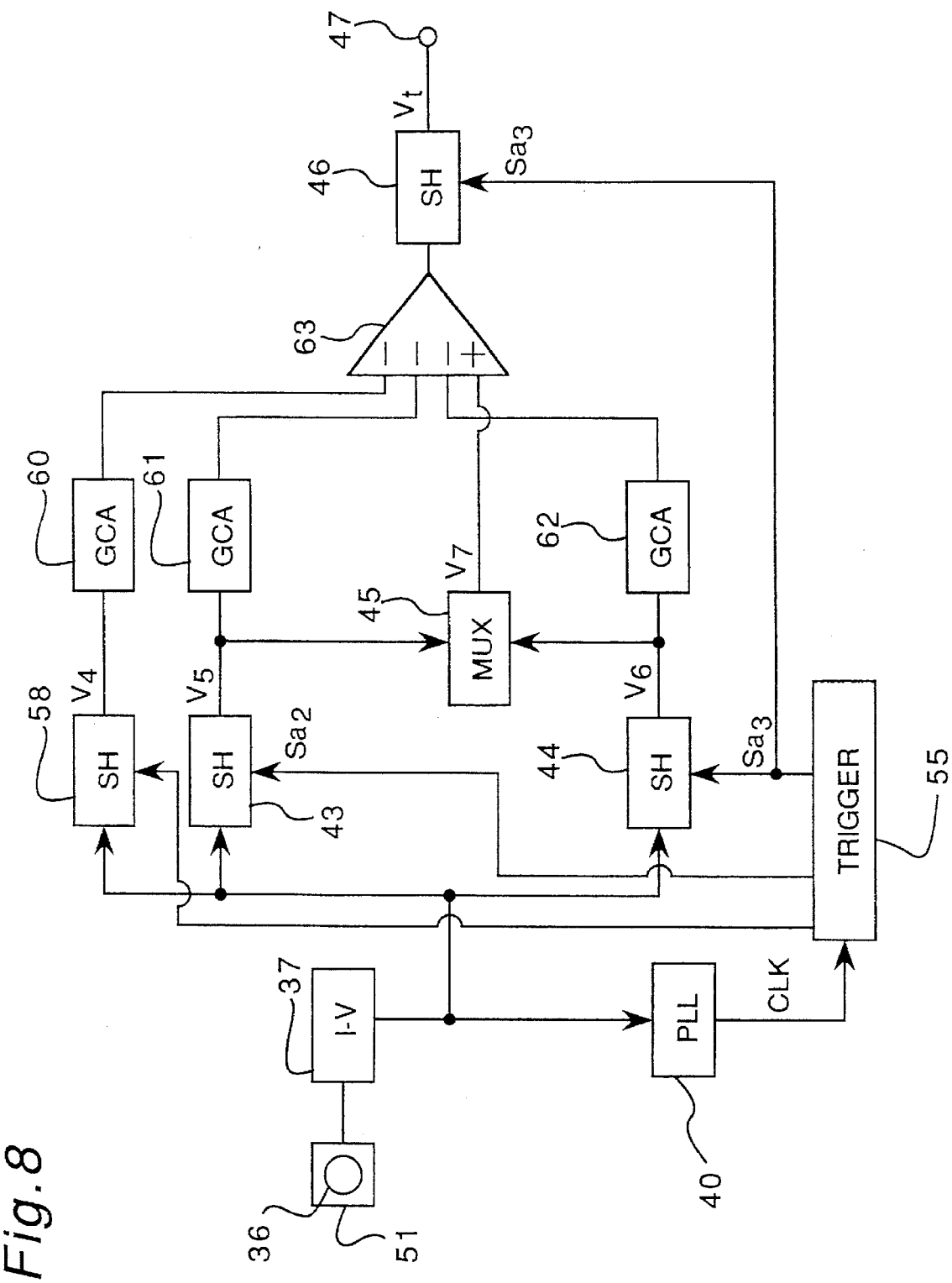
FIG. 8 is a block diagram of a circuit for detecting a tracking error signal by means of an optical data storage medium in accordance with another embodiment the present invention.

FIG. 8 shows the construction of a tracking error signal generator 30.

A light beam 36 passed through the beam splitter 4 in the optical pickup head 28 is received by the photodetector 51. A photo-to-electric converted signal from the photodetector 51 is subjected to a current-to-voltage conversion in an I–V converter 37. An output of the I–V converter 37 is transmitted to a PLL circuit 40 and also transmitted to sample and hold circuits 43, 44, and 58. The PLL circuit 40 generates a clock signal CLK synchronized with a signal obtained from a pattern recorded in the clock pattern area as shown in FIG. 7. The clock signal CLK is transmitted to a trigger generator 55 which generates timing signals Sa1, Sa2 and Sa3 each representing a timing corresponding to the position of the pattern formed in the servo pattern area. The timing signals Sa1, Sa2 and Sa3 are respectively transmitted to sample and hold circuits 58, 43 and 44, where the output signals of the I–V converter circuit 37 are sampled and held in the sample and hold circuits 58, 43 and 44 at the timing of the timing signals Sa1 through Sa3 respectively. The signals v5 and v6 sampled and held in the sample and hold circuits 43 and 44 are transmitted to the multiplier (MUX) 45 to undergo multiplication, and the resulting signal v7 is input to an operational circuit 63.

Assuming that the signals sampled and held in the sample and hold circuits 58, 43 and 44 are v4, v5 and v6 respectively and that the beam which is emitted from the optical pickup head and converged on the optical data storage medium 31 has a displacement x with respect to the center of the track, the signals v4 through v6 are approximately expressed by the following Equations 7 through 9.

$$v4 = B_1 \qquad \text{Equation 7}$$

$$v5 = -A_2 \cos(2\pi x/pt) + B_2 \qquad \text{Equation 8}$$

$$v6 = -A_2 \sin(2\pi x/pt) + B_2 \qquad \text{Equation 9}$$

In Equations 7 through 9, $A_2$ represents an amplitude, while $B_1$ and $B_2$ represent DC components.

A signal v7 obtained through multiplication in the multiplier circuit 45 is expressed by the following $$v7 = v5 \cdot v6 = A_2^2/2 \cdot \sin(4\pi x/pt) - A_2 B_2 \sin(2\pi x/pt) - A_2 B_2 \cos(2\pi x/pt) + B_2^2 \qquad \text{Equation 10}$$

The signal v7 obtained through multiplication in the multiplier 45 contains the term of $\sin(4\pi x/pt)$, i.e., a component capable of detecting a tracking error signal up to a frequency twice as high as the spatial cutoff frequency of the optical system in the same manner as the tracking error signal vt of the first embodiment. Other than the above-mentioned component, the signal v7 also contains the terms of $-A_2 B_2 \sin(2\pi x/pt)$ and $-A_2 B_2 \cos(2\pi x/pt)$ having the same frequency components as those of the signals v5 and v6 input to the multiplier 45 as well as the DC component $B_2^2$. The above-mentioned signal components behave as noise or offset with respect to the tracking error signal.

Gain control amplifier (GCA) circuits 60 through 62 receive input signals v4 through v6 respectively to amplify the signals while controlling the gain so that the output of each signal has a level for canceling the unnecessary signal components contained in the output v7 of the multiplier 45. Outputs of the gain control amplifiers 60 through 62 are input to the subtraction terminals of the operational circuit 63. The operational circuit 63 subtracts the noise or offset component from the output v7 of the multiplier 45, and a signal output from the operational circuit 63 is sampled and held in a sample and hold circuit 46 which generates the tracking error signal vt. The tracking error signal is output from an output terminal 47 as a signal expressed by the following Equation 11.

$$vt = A_2^2/2 \cdot \sin(4\pi x/pt) \qquad \text{Equation 11}$$

The tracking error signal vt has a spatial frequency twice as high as the frequency of each of the signals v4 and v5. When an optical data apparatus having the optical data storage medium and the tracking error signal detection method of the present embodiment is used, the tracking error signal can be obtained up to a frequency twice as high as the spatial cutoff frequency fc of the optical pickup head in the same manner as the optical data storage medium of the first embodiment. Therefore, even when the optical pickup head 28 includes the same light source and objective lens as those in the conventional case, the track pitch can be reduced to a half of the track pitch in the conventional case by using the optical data storage medium and the tracking error signal detection method of the present invention. In other words, data twice as much as data in the conventional case can be recorded on one optical data storage medium.

It should be noted here that, in the first and third embodiments, the patterns are formed on a track and in the position apart from the track by a distance of pt/2 in the first servo pattern area, and no pattern, i.e. only a space is formed in the second servo pattern area. The first servo pattern area and the second servo pattern area are arranged adjacent to each other as alternately formed in a direction traversing the tracks. Therefore, a construction in which a pattern is formed on a track in the first servo pattern area and another pattern is formed in a position apart from the track by a distance of pt/2 in the second servo pattern area apparently indicates the same construction of the present invention though it is differently expressed.

Fourth Embodiment

In the fourth embodiment, the same optical data apparatus as that of the first embodiment shown in FIG. 1 can be used. What differs from the first embodiment is in the fact that the tracking error signal generator 30 has a varied construction. The other components can be used in the same manner as in the first embodiment.

Figure 9:
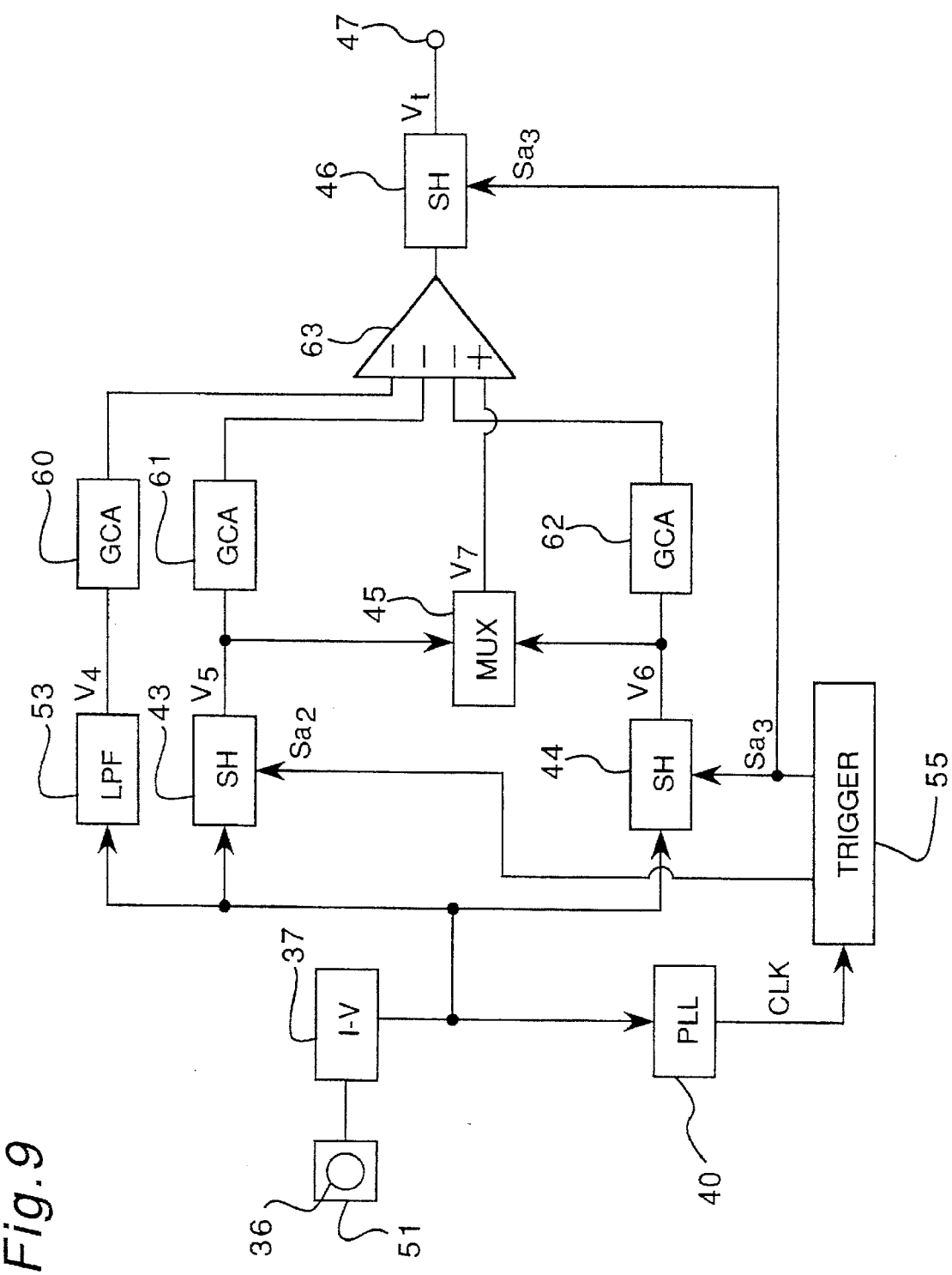
FIG. 9 is a block diagram of a circuit for detecting a tracking error signal by means of an optical data storage medium in accordance with another embodiment the present invention.

FIG. 9 shows the construction of the tracking error signal generator 30. The generator 30 has almost the same construction as that of the tracking error signal generator of the third embodiment. What differs from the third embodiment is in the fact that a low-pass filter 53 is employed to detect a DC current signal in the present embodiment instead of the sample and hold circuit 58 in the tracking error signal generator of the third embodiment. When the tracking error signal generator of the present embodiment is used, a tracking error signal containing less offset and less noise can be obtained in the same manner as the tracking error signal generator in the third embodiment.

Fifth Embodiment

In the fifth embodiment, the same optical data apparatus as that of the first embodiment shown in FIG. 1 can be used. What differs from the first embodiment is in the fact that the servo pattern area on the optical data storage medium 31 and the tracking error signal generator 30 have varied constructions. The other components can be used utterly in the same manner as in the first embodiment.

Figure 10:
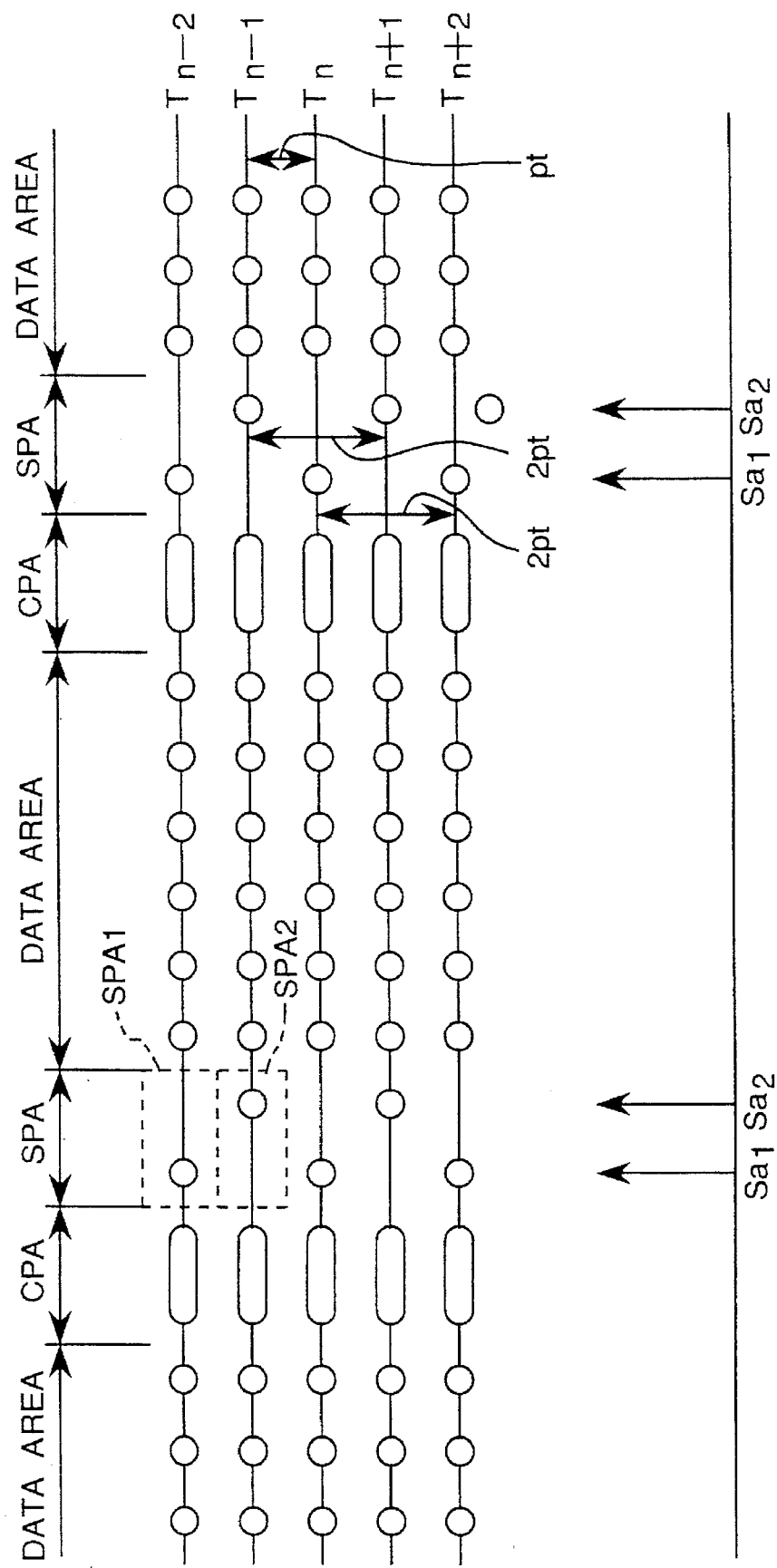
FIG. 10 is a schematic diagram of tracks on an optical data storage medium in accordance with another embodiment of the present invention.

FIG. 10 shows a schematic diagram of tracks formed on the optical data storage medium 31. In the same manner as in the first embodiment, it is assumed that the n-th track is Tn, the (n−2)th track is Tn−2, . . . , and the (n+2)th track is Tn+2 in the present embodiment. On each of the tracks Tn−2 through Tn+2, there is cyclically arranged a combination of a clock pattern area in which a pattern for generating timing signals Sa1 and Sa2 each representing a timing for sampling a signal obtained from a servo pattern area is formed, the servo pattern area in which a pattern for generating a servo signal is formed, and a data area in which a pattern for storing data is formed.

There are two patterns to be recorded in the servo pattern area. The first pattern belongs an area which is referred to as the first servo pattern area, while the second pattern belongs to an area which is referred to as the second servo pattern area. In each of the first and second servo pattern areas, there are formed a pair of mark and space on a track. The marks and the spaces in the servo pattern areas are arranged so that the space in the first servo pattern area and the mark in the second servo pattern area are arranged adjacent to each other in a direction traversing the tracks, while the mark in the first servo pattern area and the space in the second servo pattern area are arranged adjacent to each other in the same manner.

Figure 11:
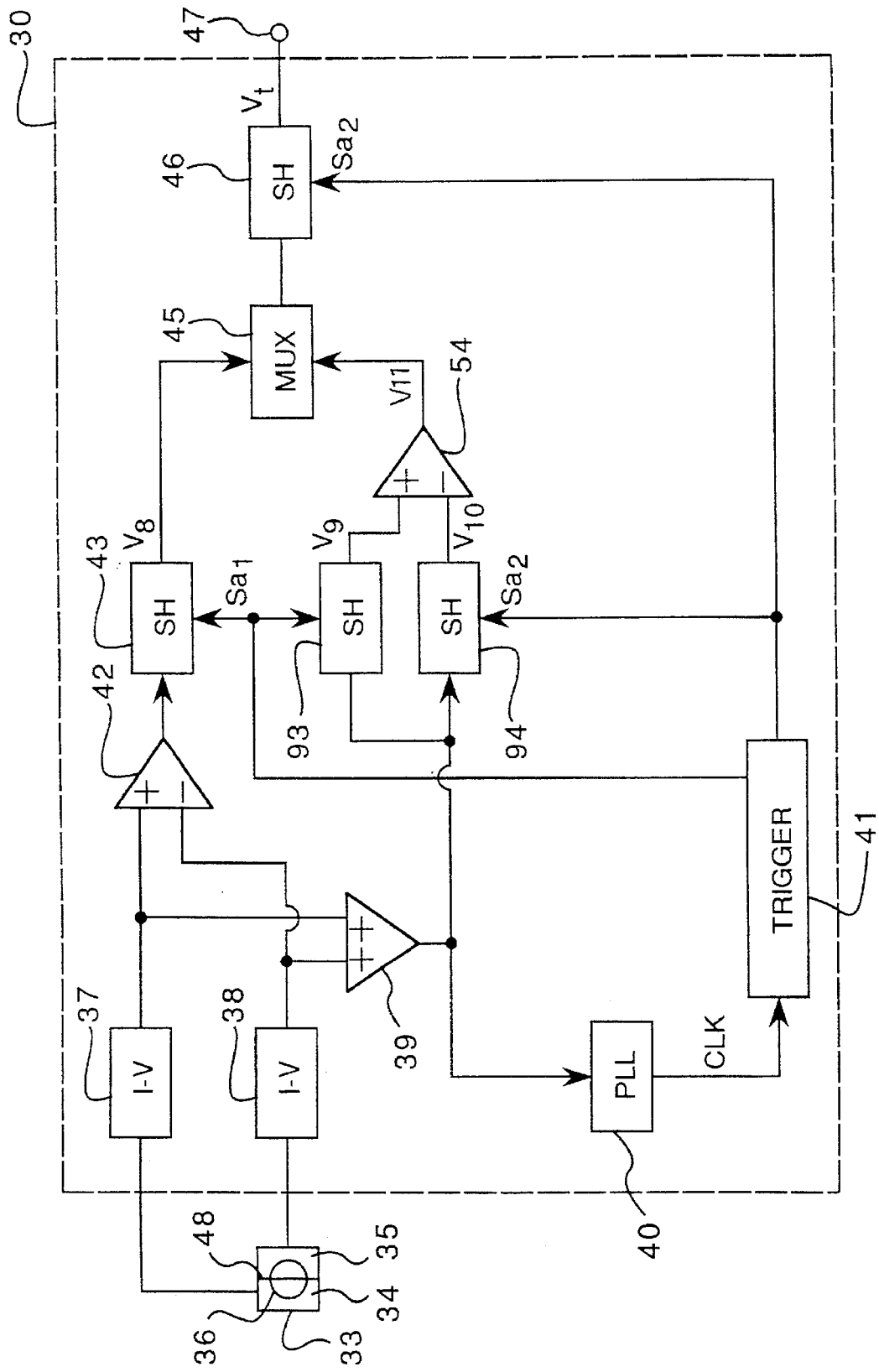
FIG. 11 is a block diagram of a circuit for detecting a tracking error signal by means of an optical data storage medium in accordance with another embodiment the present invention.

FIG. 11 shows the construction of the tracking error signal generator 30. The beam 36 from the optical pickup head 28 is received by the photodetector 33. Electric signals from the light-detecting sections 34 and 35 are subjected to a current-to-voltage conversion respectively in the I–V converters 37 and 38. Outputs of the I–V converters 37 and 38 are transmitted to both the differential operational circuit 42 and the adder 39. The signal obtained through addition in the adder 39 is input to the PLL circuit 40. The PLL circuit 40 generates a clock signal CLK synchronized with the signal obtained from the pattern recorded in the clock pattern area. The clock signal CLK is transmitted to the trigger generator 41 to be used for generating the timing signals Sa1 and Sa2 each representing a timing corresponding to the position of the pattern formed in the servo pattern area of the optical data storage medium 31.

The signal obtained through addition in the adder 39 is also input to sample and hold circuits 93 and 94. The sample and hold circuits 93 and 94 sample and hold the output of the adder 39 at the timing of the timing signals Sa1 and Sa2. The signal output from the differential operational circuit 42 is input to the sample and hold circuit 43. The sample and hold circuit 43 samples and holds the output of the differential operational circuit 42 at the timing of the timing signal Sa1. A signal v8 sampled and held in the sample and hold circuit 43 is transmitted to the multiplier 45. Signals v9 and v10 sampled and held in the sample and hold circuits 93 and 94 are input to a differential operational circuit 54. A signal v11 output from the differential operational circuit 54 is also transmitted to the multiplier 45. The signal transmitted to the multiplier circuit 45 undergoes multiplication and then sampled and held in the sample and hold circuit 46 to be generated as the tracking error signal vt. The tracking error signal vt is output from the output terminal 47.

Assuming that the beam from the optical pickup head has a displacement x with respect to the center of the track, the signals v8 through V11 have sine waveforms as approximately expressed by the following Equations 12 through 15.

| | |
|---|---|
| $v8 = A_1 \sin(2\pi x/pt)$ | Equation 12 |
| $v9 = A_2 \cos(2\pi x/pt) + B_2$ | Equation 13 |
| $v10 = -A_2 \cos(2\pi x/pt) + B_2$ | Equation 14 |
| $v11 = v9 - v10 = 2 * A_2 \cos(2\pi x/pt)$ | Equation 15 |

The tracking error signal vt is expressed by the following Equation 16.

| | |
|---|---|
| $vt = v8 \cdot v11 = A_1 \cdot A_2 \sin(4\pi x/pt)$ | Equation 16 |

The tracking error signal vt has a spatial frequency twice as high as the frequency of each of the signals v8 and v11. When an optical data apparatus having the optical data storage medium and the tracking error signal detection method of the present embodiment is used, the tracking error signal can be obtained up to a frequency twice as high as the spatial cutoff frequency of the optical pickup head in the same manner as the optical data storage medium of the first embodiment. Therefore, even when the optical pickup head 28 includes the same light source and objective lens as those in the conventional case, the track pitch can be reduced to a half of the track pitch in the conventional case by using the optical data storage medium and the tracking error signal detection method of the present invention. In other words, data twice as much as data in the conventional case can be recorded on one optical data storage medium.

Sixth Embodiment

In the sixth embodiment, the same optical data apparatus as that of the first embodiment shown in FIG. 1 can be used. The same tracking error signal generator as in the fifth embodiment can be used. What differs from the first and fifth embodiments is in the fact that the servo pattern area on the optical data storage medium 31 has a varied construction.

Figure 12:
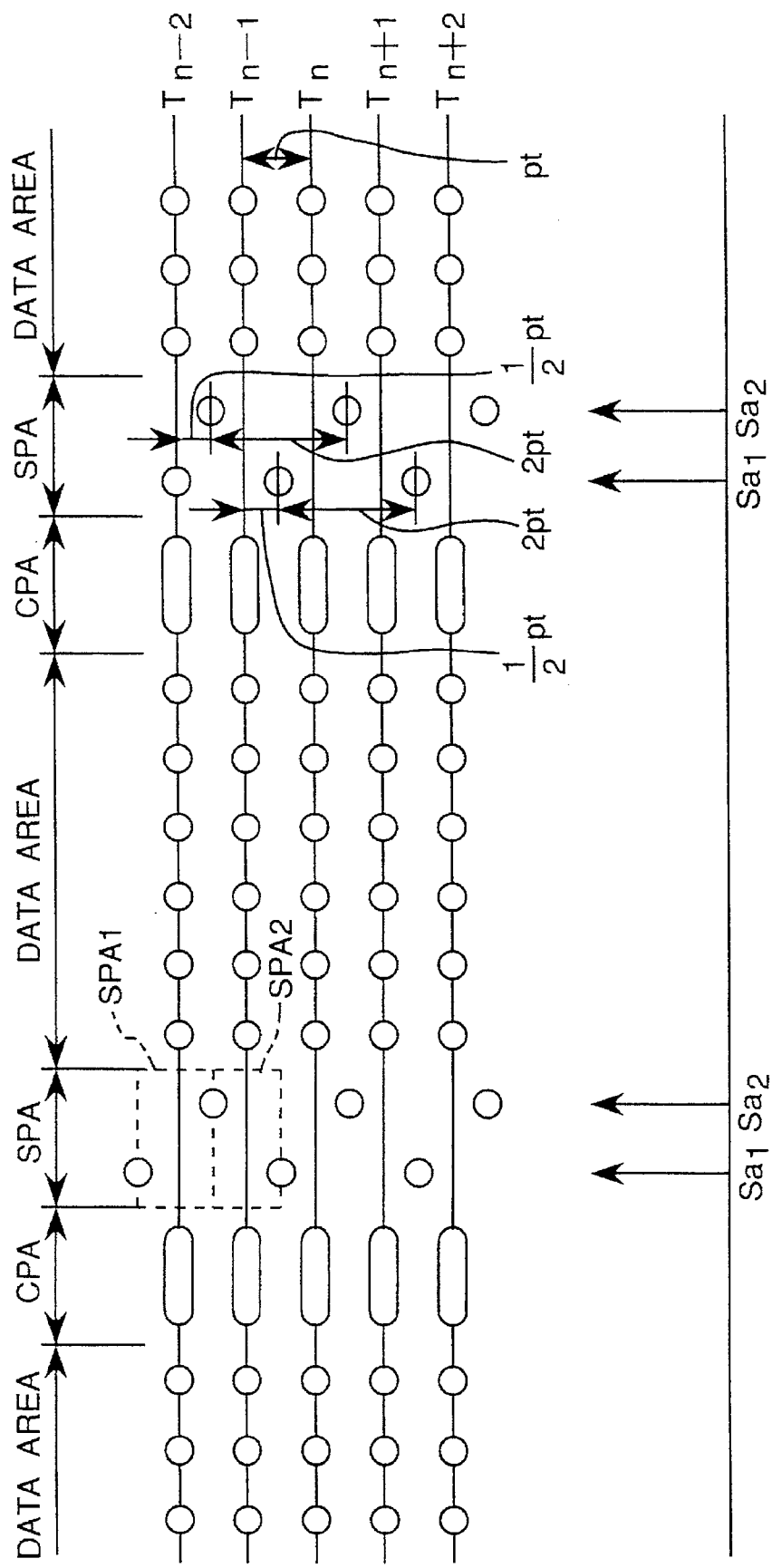
FIG. 12 is a schematic diagram of tracks on an optical data storage medium in accordance with another embodiment of the present invention.

FIG. 12 shows a schematic diagram of tracks formed on the optical data storage medium 31. According to the present embodiment, there are formed a mark in a position apart from a track by a distance of pt/2 and a space on the track in each of the first servo pattern area and the second servo pattern area, where the mark and the space in each of the servo pattern areas are arranged so that the space in the first servo pattern area and the mark in the second servo pattern area are arranged adjacent to each other, and the mark in the first servo pattern area and the space in the second servo pattern area are arranged adjacent to each other. Furthermore, the two marks are so arranged that the mark in the first servo pattern area and the mark in the second servo pattern area are arranged apart from each other by a distance of 2·pt in the direction perpendicular to the track.

By means of the optical data storage medium of the present embodiment, the tracking error signal can be detected in the same manner as in the case where the optical data storage medium of the fifth embodiment is used.

Seventh Embodiment

In the seventh embodiment, the same optical data apparatus as that of the first embodiment shown in FIG. 1 can be used. What differs from the preceding embodiments is in the fact that the servo pattern area on the optical data storage medium 31 and the tracking error signal generator 30 have varied constructions. The other components can be used utterly in the same manner as in the first embodiment.

Figure 13:
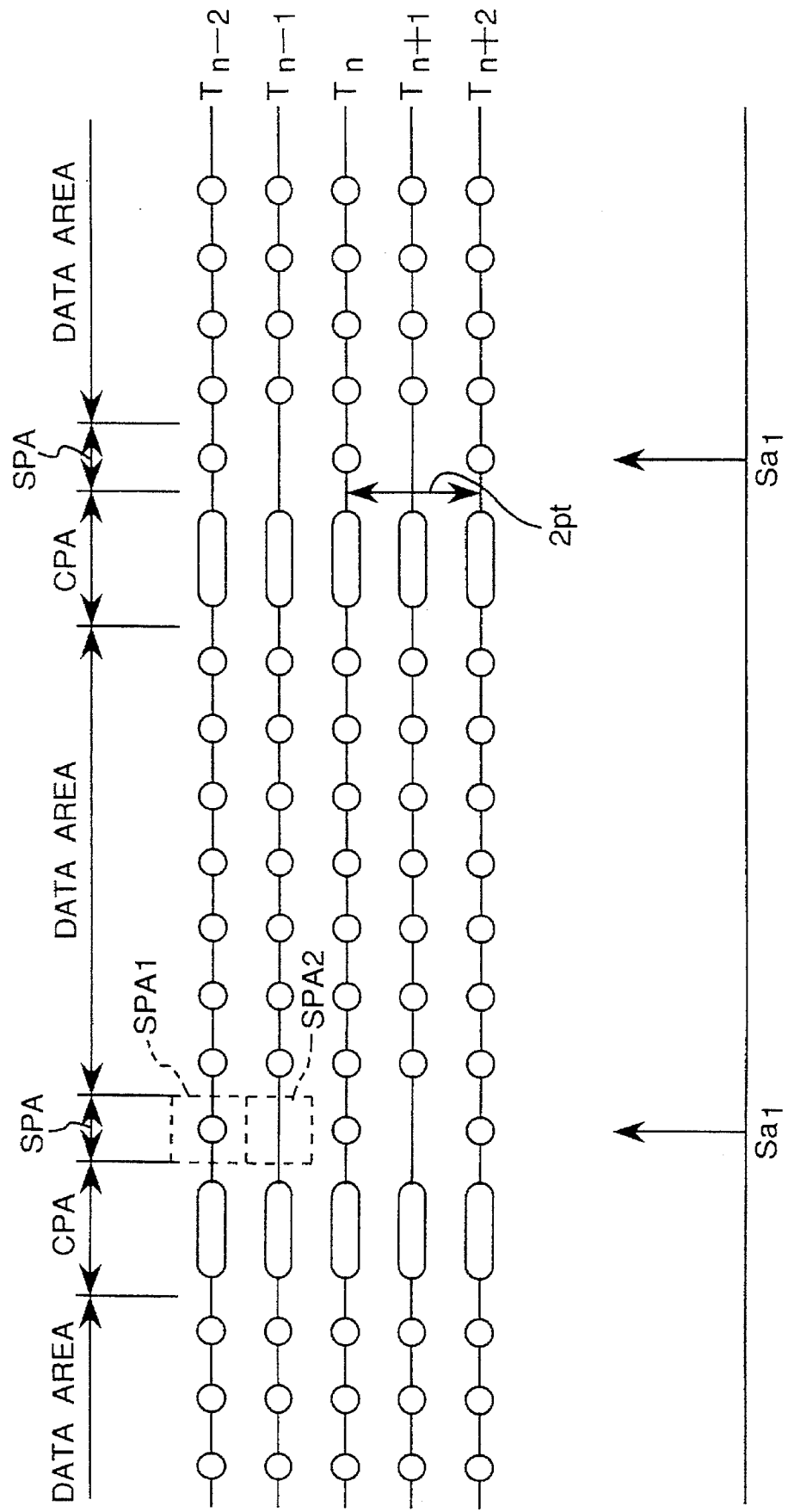
FIG. 13 is a schematic diagram of tracks on an optical data storage medium in accordance with another embodiment of the present invention.

FIG. 13 shows a schematic diagram of tracks on the optical data storage medium which has almost the same construction as those of the optical data storage media of the first through sixth embodiments. What differs from the preceding embodiments is the fact that a mark is formed on a track in the first servo pattern area, while no mark is formed in the second servo pattern area.

Alternatively, the first servo pattern area may have a combination of a mark (M1) and a space, while the second servo pattern area having a space without any mark.

Figure 14:
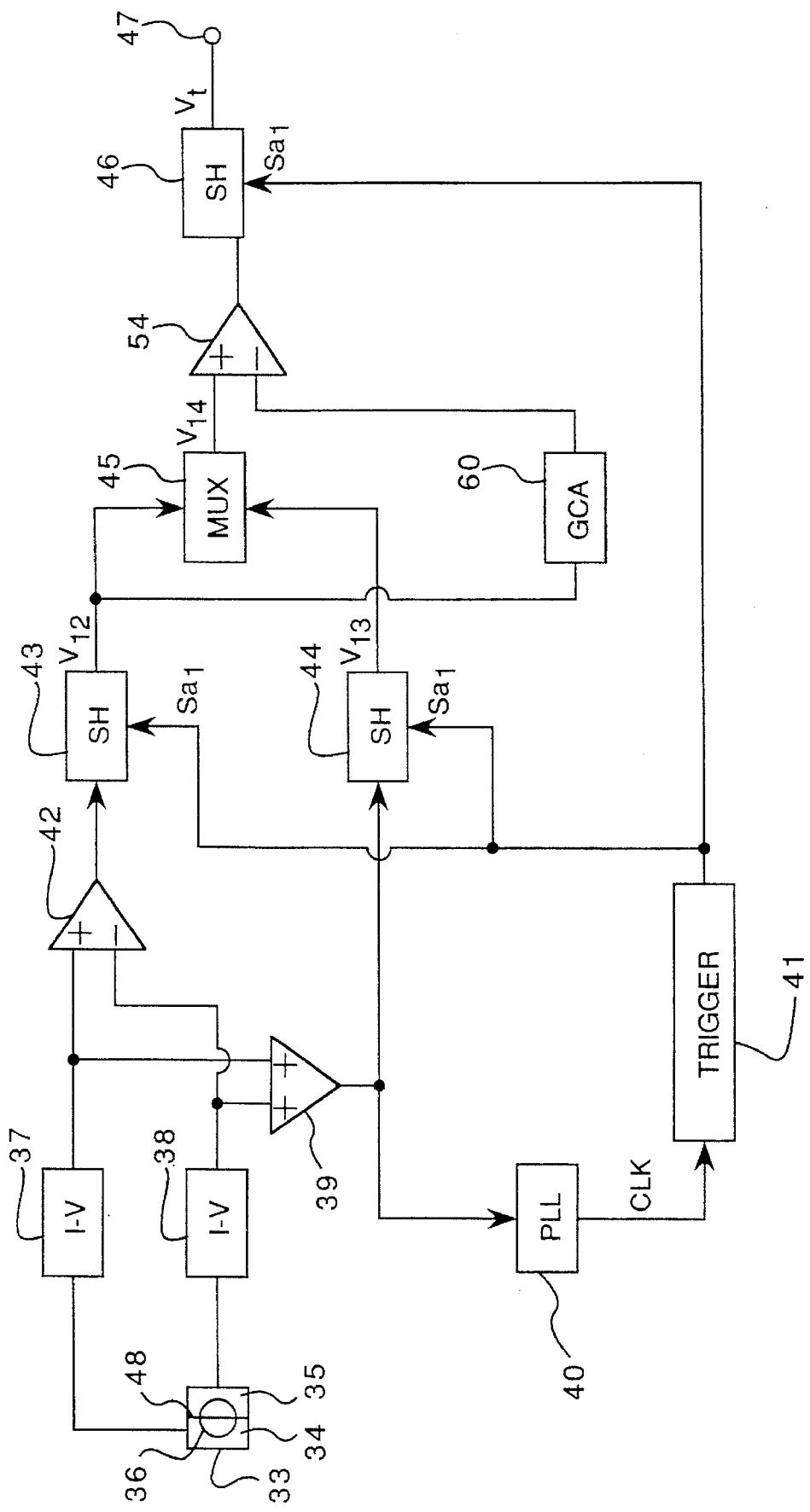
FIG. 14 is a block diagram of a tracking error signal detector circuit in accordance with an embodiment of the present invention.

FIG. 14 shows the construction of the tracking error signal generator. The beam 36 from the optical pickup head 28 is received by the photodetector 33. Electric signals output from the light-detecting sections 34 and 35 are subjected to current-to-voltage conversion in the I–V converters 37 and 38 respectively. The outputs of the I–V converter circuits 37 and 38 are transmitted to the adder 39 and the differential operational circuit 42. An output of the adder 39 is transmitted to the PLL circuit 40 and the sample and hold circuit 44. An output of the differential operational circuit 42 is transmitted to the sample and hold circuit 43.

The PLL circuit 40 generates a clock signal CLK synchronized with a signal obtained from a pattern recorded in the clock pattern area of the optical data storage medium as shown in FIG. 13. The clock signal CLK is transmitted to the trigger generator 41 which generates a timing signal Sa1 representing a timing corresponding to the position of the pattern formed in the servo pattern area. The sample and hold circuits 43 and 44 sample and hold an input signal at the timing of the timing signal Sa1. The signals sampled and held in the sample and hold circuits 43 and 44 are transmitted to the multiplier 45 to undergo multiplication and then input to the differential operational circuit 54.

Assuming that the signals sampled and held in the sample and hold circuits 43 and 44 are v12 and v13 respectively and the beam which is emitted from the optical pickup head and converged on the optical data storage medium 31 has a displacement x with respect to the center of the track, the signals v12 and v13 are approximately expressed by the following Equations 17 and 18.

$$v12 = -A_3 \sin(2\pi x/pt) \qquad \text{Equation 17}$$

$$v13 = -A_4 \cos(2\pi x/pt) + B_4 \qquad \text{Equation 18}$$

In Equations 17 and 18, $A_3$ and $A_4$ represent amplitudes, while $B_4$ represents a DC component.

A signal v14 obtained through multiplication in a multiplier 84 is expressed by the following Equation 19.

$$v14 = v12 \cdot v13 = A_3 A_4/2 \cdot \sin(4\pi x/pt) - A_3 B_4 \sin(2\pi x/pt) \qquad \text{Equation 19}$$

The signal v14 obtained through multiplication in the multiplier 45 contains the term of $\sin(4\pi x/pt)$, i.e., a component capable of detecting a tracking error signal up to a frequency twice as high as the spatial cutoff frequency of the optical system in the same manner as in the first embodiment. Other than the above-mentioned component, the signal v14 also contains the term of $-A_3 B_4 \sin(2\pi x/pt)$ having the same frequency component as that of the signal v8 input to the multiplier 45. The above-mentioned signal component behaves as a noise with respect to the tracking error signal.

The gain control amplifier (GCA) 60 receives the signal v12 to amplify the signal while controlling the gain so that its output signal has a level for canceling the unnecessary signal components contained in the output v14 of the multiplier circuit 45. The output of the gain control amplifier 60 is input to the differential operational circuit 54. The differential operational circuit 54 subtracts the noise component from the output v14 of the multiplier circuit 45, and a signal output from the operational circuit 54 is sampled and held in the sample and hold circuit 46 which generates the tracking error signal vt. The tracking error signal is output from the output terminal 47 to be a signal as expressed by the following Equation 20.

$$vt = A_3 A_4/2 \cdot \sin(4\pi x/pt) \qquad \text{Equation 20}$$

The tracking error signal vt has a spatial frequency twice as high as the frequency of each of the signals v12 and v13. When an optical data apparatus having the optical data storage medium and the tracking error signal detection method of the present embodiment is used, the tracking error signal can be obtained up to a frequency twice as high as the spatial cutoff frequency fc of the optical pickup head in the same manner as the optical data storage medium of each of the first through sixth embodiments.

When the tracking error signal detection is executed according to the optical data storage medium and the tracking error signal detection method of the present embodiment, the tracking error signal can be obtained only from the signals sampled at the timing of Sa1. Therefore, even when the power of the beam generated from the light source 1 in the optical pickup head 28 fluctuates depending on time, the tracking error signal can be obtained stably. Furthermore, since the tracking error signal can be obtained only from the signals sampled at the timing of Sa1, the servo pattern area can be dimensionally reduced to allow the unnecessary servo pattern area to serve as a data area. In other words, a greater amount of data can be recorded on the optical data storage medium.

Eighth Embodiment

Figure 15:
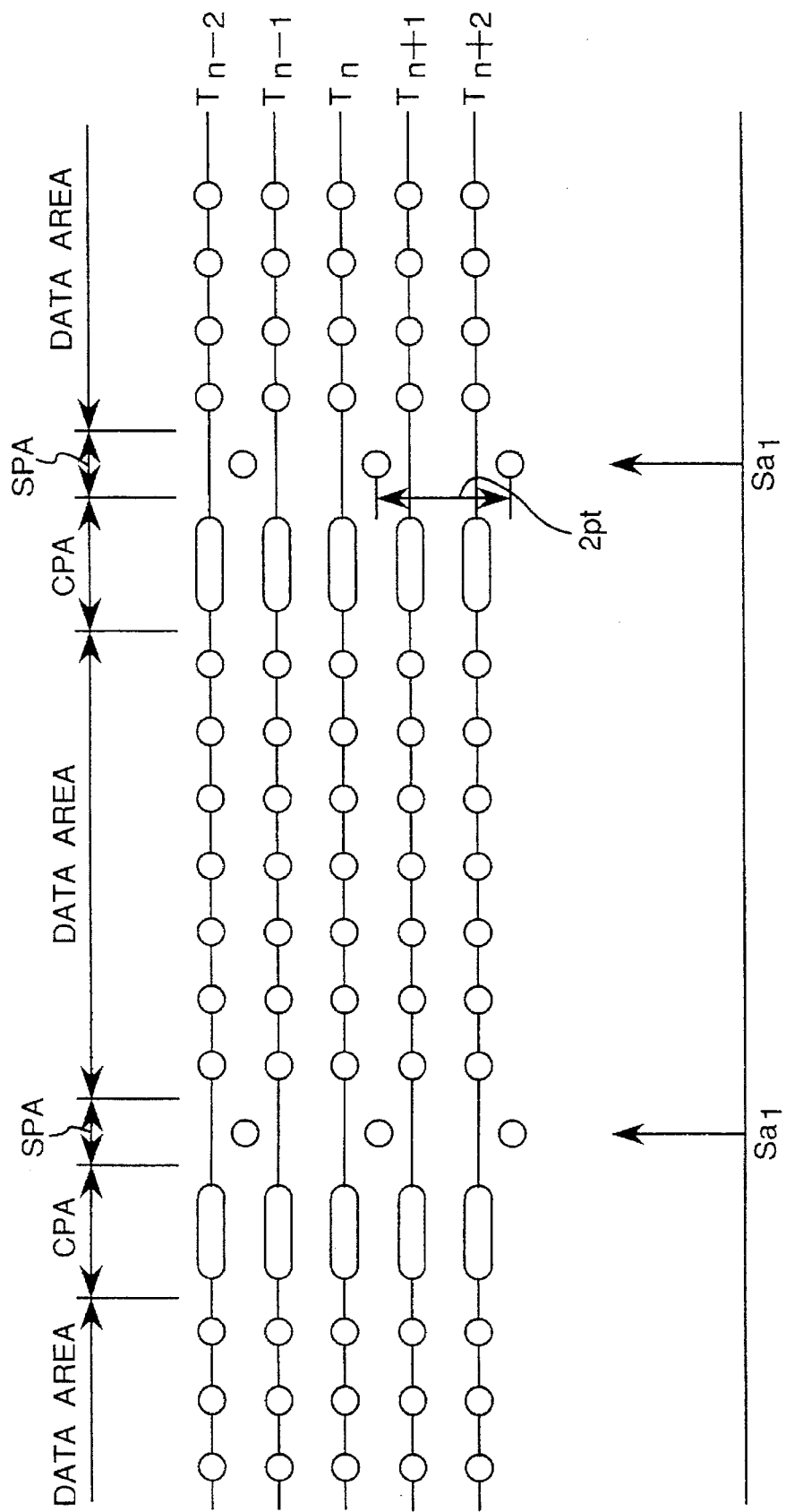
FIG. 15 is a schematic diagram of tracks on an optical data storage medium in accordance with another embodiment of the present invention.

FIG. 15 shows a schematic arrangement of tracks formed on an optical data storage medium in accordance with the eighth embodiment of the present invention. The optical data storage medium of present embodiment has almost the same construction as those of the first through seventh embodiments. What differs from the preceding embodiments is the fact that a mark is formed in a position apart from the track by a distance of pt/2 in the first servo pattern area and no mark is formed in the second servo pattern area.

Alternatively, the first servo pattern area may have a combination of a mark (M1) and a space, while the second servo pattern area having a space without any mark.

The tracking error signal generator may have a circuit configuration as in the description for the seventh embodiment as shown in FIG. 14. The operation of the circuit has been already described in detail on the seventh embodiment, and therefore the description therefor is omitted herein.

Assuming that the signals sampled and held in the sample and hold circuits 43 and 44 are v12 and v13 respectively and the beam which is emitted from the optical pickup head 28 and converged on the optical data storage medium 31 has a displacement x with respect to the center of the track, the signals v12 and v13 are approximately expressed by the following Equations 21 and 22.

$$v12 = -A_3 \cos(2\pi x/pt) \quad \text{Equation 21}$$

$$v13 = -A_4 \sin(2\pi x/pt) + B_4 \quad \text{Equation 22}$$

In Equations 21 and 22, $A_3$ and $A_4$ represent amplitudes, while $B_4$ represents a DC component.

A signal v14 obtained through multiplication in the multiplier 45 is expressed by the following Equation 23.

$$v14 = v12 \cdot v13 = A_3 A_4/2 \cdot \sin(4\pi x/pt) - A_3 B_4 \cos(2\pi x/pt) \quad \text{Equation 23}$$

The signal v14 obtained through multiplication in the multiplier 45 contains the term of $\sin(4\pi x/pt)$, i.e., a component capable of detecting a tracking error signal up to a frequency twice as high as the spatial cutoff frequency of the optical system in the same manner as the signal vt in the first embodiment. A noise component contained in the signal v14 is canceled in the differential operational circuit 54. The tracking error signal vt is output from the output terminal 47, the signal expressed by the following Equation 24.

$$vt = A_3 A_4/2 \cdot \sin(4\pi x/pt) \quad \text{Equation 24}$$

In the case of the optical data storage medium of the present embodiment, the tracking error signal can be obtained up to a frequency twice as high as the spatial cutoff frequency fc of the optical pickup head in the same manner as the optical data storage medium as described on the first through seventh embodiments. When the tracking error signal detection is executed by means of the optical data storage medium of the present embodiment, the tracking error signal can be obtained only from the signal sampled at the timing of Sa1 in the same manner as the optical data storage medium of the seventh embodiment. Therefore, even when the power of the beam of the light source 1 in the optical pickup head 28 fluctuates depending on time, the tracking error signal can be obtained stably.

Furthermore, since the tracking error signal can be obtained only from the signal sampled at the timing of Sa1, the servo pattern area can be dimensionally reduced to allow the unnecessary servo pattern area to serve as a data area. In other words, a greater amount of data can be recorded on the optical data storage medium.

Ninth Embodiment

Although a clock pattern area is provided on the optical data storage medium in the first through eighth embodiments, it is also possible to eliminate the pattern formed in the clock pattern area or the clock pattern area itself by forming in the data area or the servo pattern area a pattern having the same function as that of the pattern formed in the clock pattern area.

Figure 16:
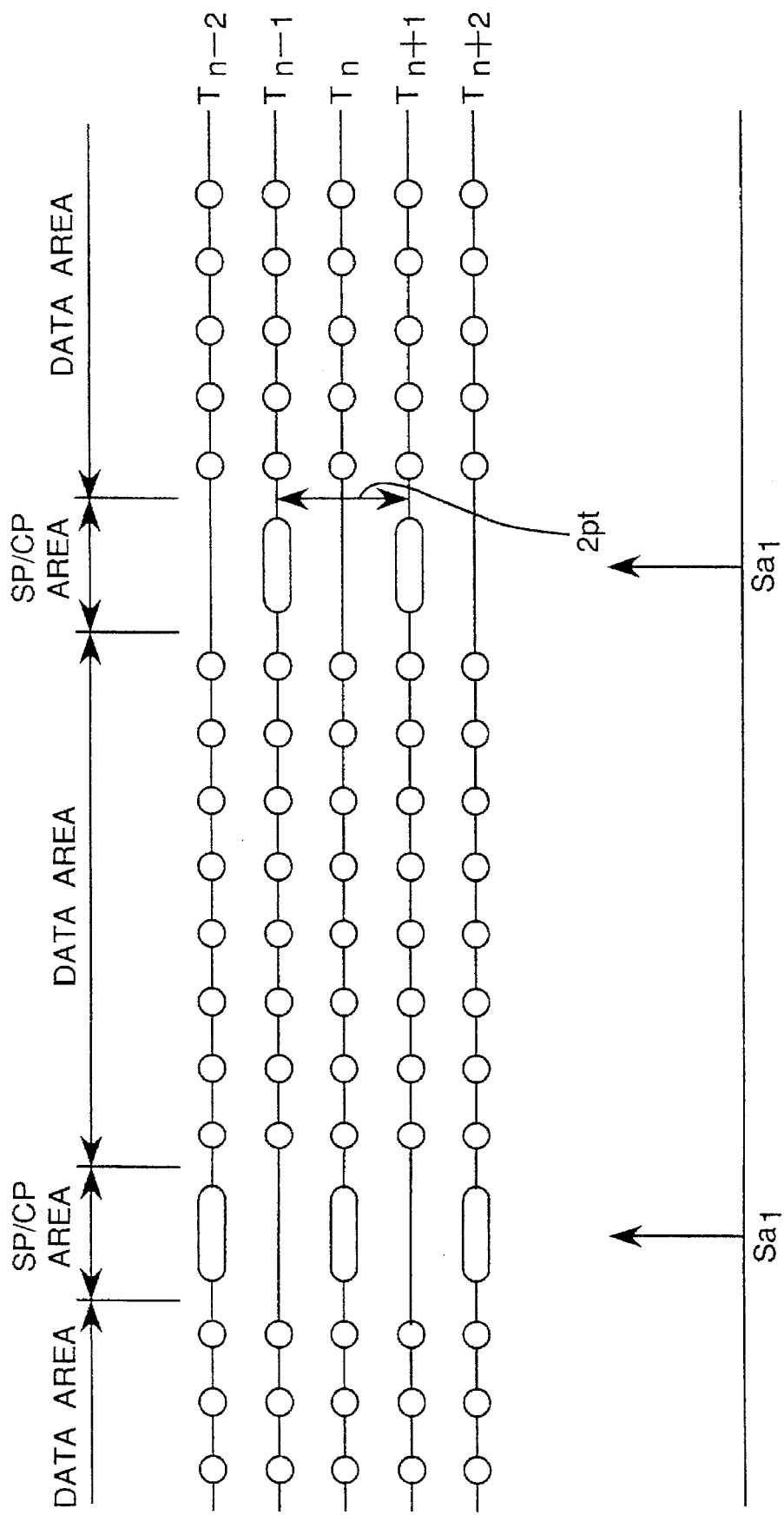
FIG. 16 is a schematic diagram of tracks on an optical data storage medium in accordance with another embodiment of the present invention.

FIG. 16 shows a schematic arrangement of tracks formed on an optical data storage medium in accordance with the ninth embodiment of the present invention. The optical data storage medium of present embodiment has almost the same construction as that of the seventh embodiment shown in FIG. 13. What differs is the fact that a mark to be formed in the servo pattern area has the same configuration as that of the mark to be formed in the clock pattern area. According to the optical data storage medium of the present embodiment, the servo pattern area and the clock pattern area can be dimensionally reduced to allow the unnecessary servo pattern area or clock pattern area to be utilized as a data area. In other words, a greater amount of data can be recorded and reproduced on the optical data storage medium.

Tenth Embodiment

Figure 17:
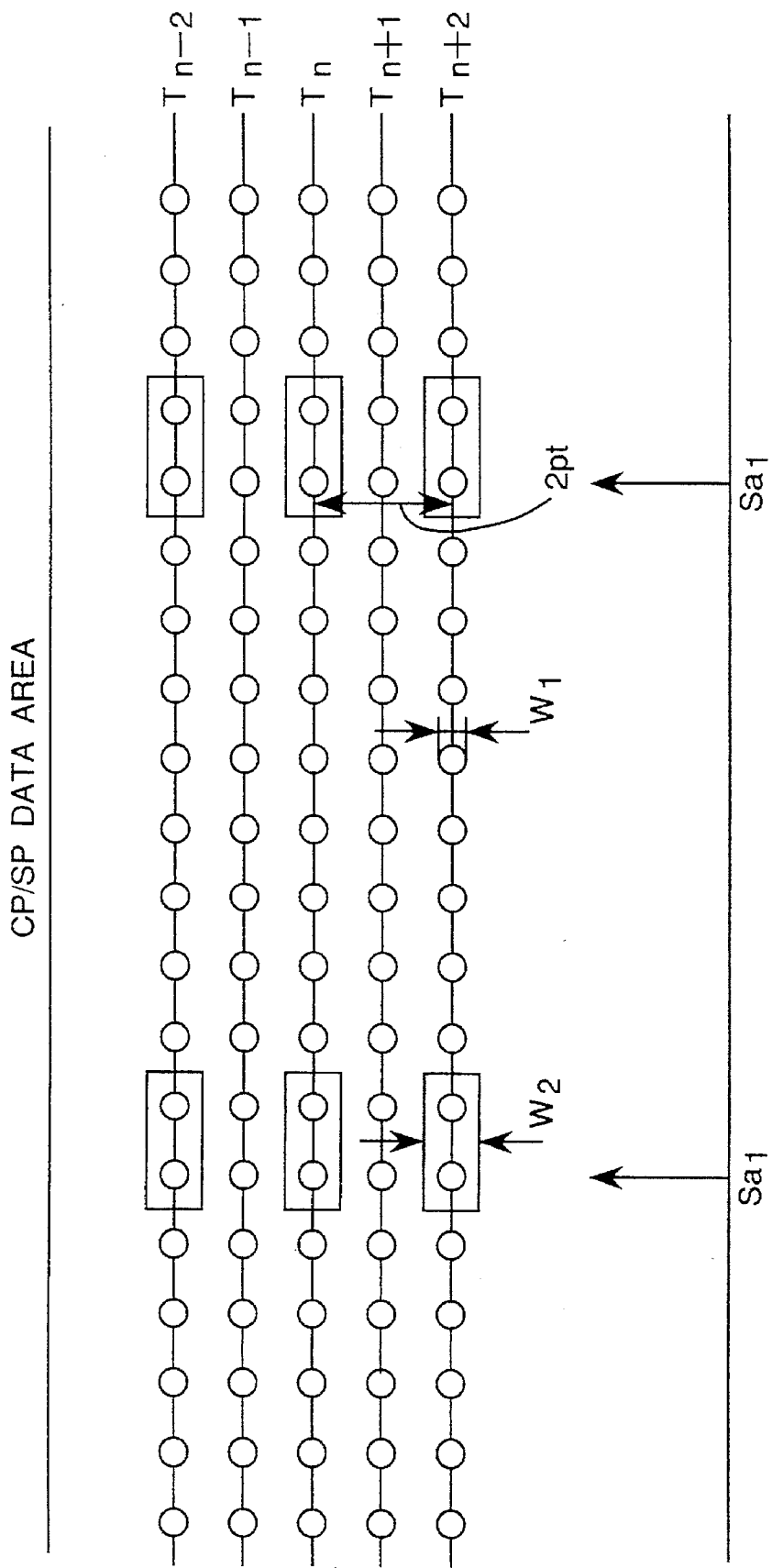
FIG. 17 is a schematic diagram of tracks on an optical data storage medium in accordance with another embodiment of the present invention.

FIG. 17 shows a schematic arrangement of tracks formed on an optical data storage medium in accordance with the tenth embodiment of the present invention. The optical data storage medium of present embodiment has almost the same construction as that of the seventh embodiment shown in FIG. 13. What differs is the fact that a mark to be formed in the servo pattern area has the same configuration as that of the mark to be formed in the clock pattern area, and the mark is formed in the data area. The width w2 of the mark for obtaining the clock signal and the tracking error signal is made greater than the width w1 of the mark to be recorded in the data area. That is, the mark formed in the servo pattern area has a width greater than the width of the mark formed in the data recording area.

The optical data storage medium of the present embodiment is appropriate for use as an optical data storage medium capable of recording data. It is preferred that the mark for obtaining the clock signal and the tracking error signal is preliminarily recorded as a pit-shaped pattern. The mark to be recorded in the data area is recorded in the same manner as in the conventional case. The data recording medium may be made of a material such as a phase-change material, magneto-optic material, or the like which has been conventionally used.

Since the servo pattern area and the clock pattern area exist in the data area according to the optical data storage medium of the present embodiment, the entire surface of the optical data storage medium can be used as a data area to allow a greater amount of data to be recorded on the optical data storage medium.

Eleventh Embodiment

Figure 18:
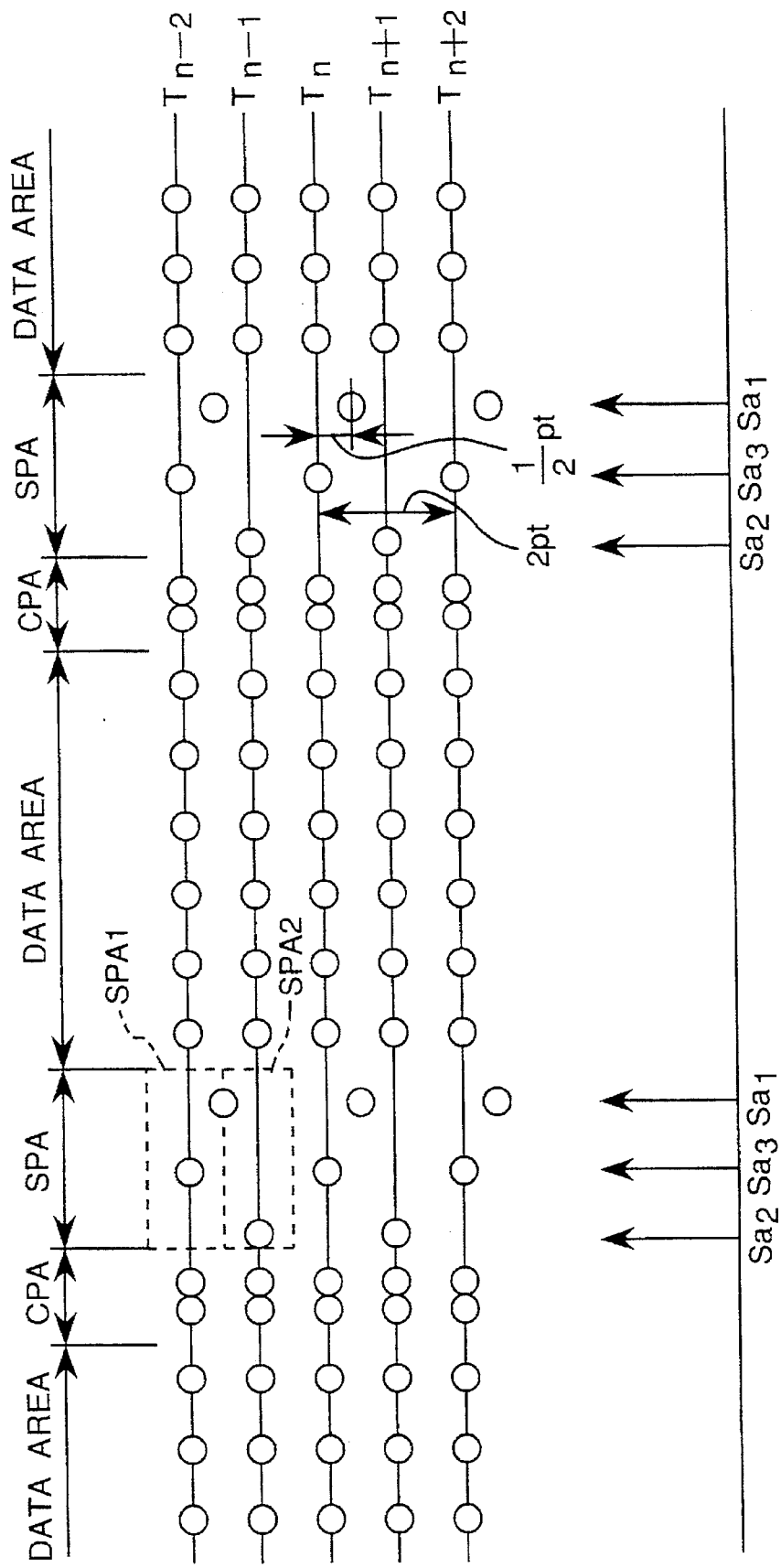
FIG. 18 is a schematic diagram of tracks on an optical data storage medium in accordance with another embodiment of the present invention.

FIG. 18 shows a schematic arrangement of tracks formed on an optical data storage medium in accordance with the eleventh embodiment of the present invention. The optical data storage medium of the present embodiment has almost the same construction as those of the first through tenth embodiments. What differs from the preceding embodiments is the fact that the servo pattern area on the optical data storage medium 31 and the tracking error signal generator 30 have varied constructions. The other components can be used in the same manner as in the first embodiment.

Referring to FIG. 18, the second servo pattern area has a mark formed on a track, while the first servo pattern area has a mark formed on a track and another mark formed in a position apart from the track by a distance of pt/2. Each portion where no mark is formed represents a space. The marks are arranged so that the marks in the first servo pattern area and the spaces in the second servo pattern area are arranged adjacent to each other, and the space in the first servo pattern area and the mark in the second servo pattern area are arranged adjacent to each other. The spaces formed in the second servo pattern area are continuously arranged.

Alternatively, the mark in the second servo pattern area is formed on an extension line of the track, while the two marks in the first servo pattern area are each formed in a position apart by a distance of pt/2 from the extension line of the track, so that the two marks formed in the first servo pattern area are arranged apart by a distance of pt in a direction perpendicular to the track.

Figure 19:
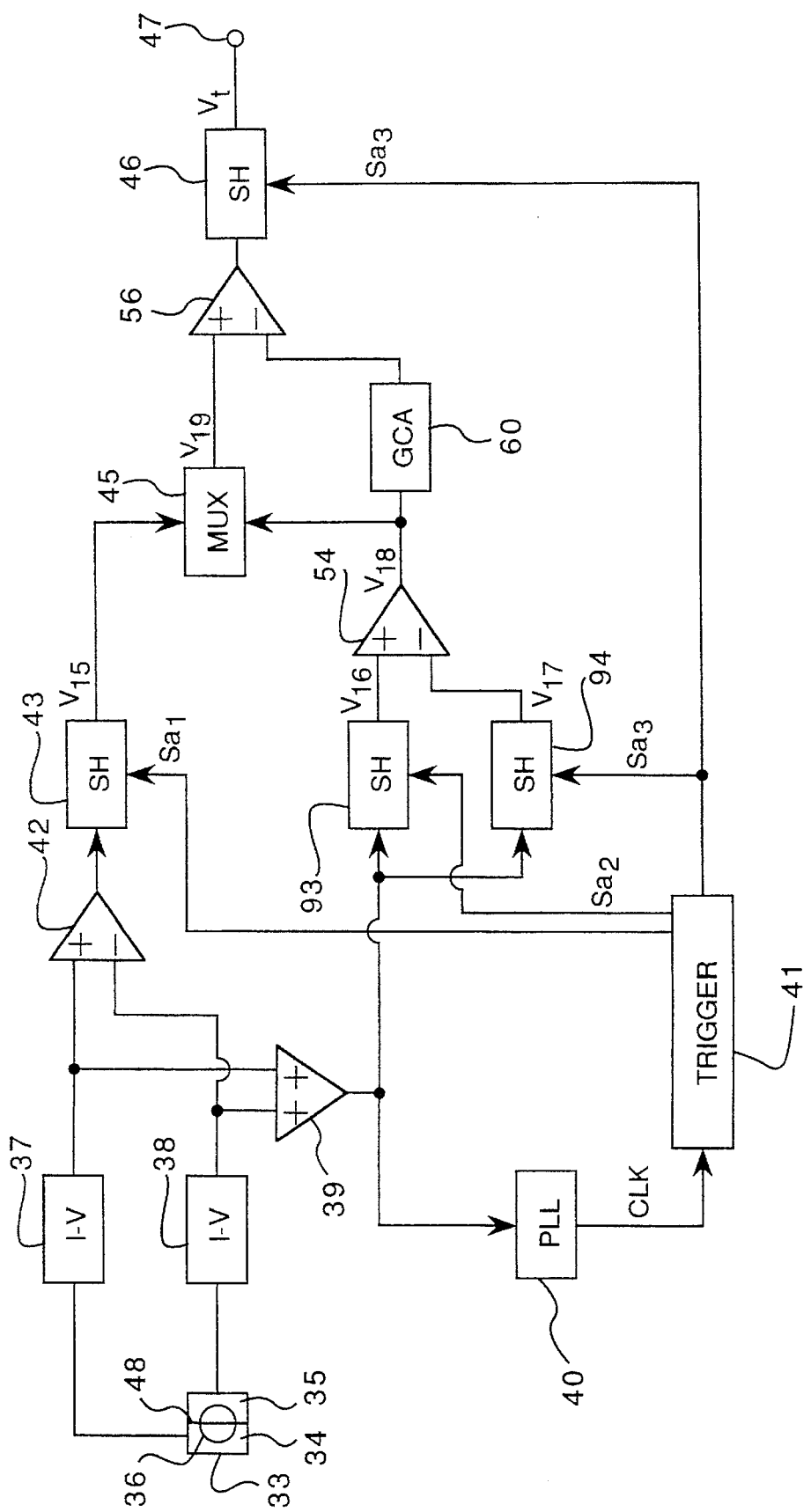
FIG. 19 is a block diagram of a tracking error signal detector circuit in accordance with another embodiment of the present invention.

FIG. 19 shows the construction of the tracking error signal generator. The beam 36 from the optical pickup head 28 is received by the photodetector 33. Electric signals from the light-detecting sections 34 and 35 are subjected to current-to-voltage conversion in the I–V converter circuits 37 and 38. Output signals of the I–V converter circuits 37 and 38 are input to the adder 39 and the differential operational circuit 42. An output of the adder 39 is transmitted to the PLL circuit 40 and also to the sample and hold circuits 93 and 94. An output of the differential operational circuit 42 is transmitted to the sample and hold circuit 43.

The PLL circuit 40 generates a clock signal CLK synchronized with a signal obtained from a pattern recorded in the clock pattern area of the optical data storage medium as shown in FIG. 18. The clock signal CLK is transmitted to the trigger generator 41 which generates timing signals Sa1 through Sa3 each representing a timing corresponding to the position of the pattern formed in the servo pattern area.

In the sample and hold circuits 43, 93, and 94, the input signals are sampled and held at the timing of the timing signals Sa1 through Sa3 respectively. The signal held in the sample and hold circuit 43 is transmitted to the multiplier 45. Meanwhile, the signals held in the sample and hold circuits 93 and 94 are transmitted to the differential operational circuit 54 to undergo differential operation and then input to the multiplier 45.

Assuming that the signals sampled and held in the sample and hold circuits 43, 93, and 94 are v15, v16, and v17 respectively and the beam which is emitted from the optical pickup head and converged on the optical data storage medium 31 has a displacement x with respect to the center of the track, the signals v15 through v17 are approximately expressed by the following Equations 25 through 27.

$$v15 = A_2 \sin(2\pi x/pt) + B_2 \qquad \text{Equation 25}$$

$$v16 = A_2 \cos(2\pi x/pt) + B_2 \qquad \text{Equation 26}$$

$$v17 = -A_2 \cos(2\pi x/pt) + B_2 \qquad \text{Equation 27}$$

In Equations 25 through 27, $A_2$ represents an amplitude, while $B_2$ represents a DC component.

A signal v18 obtained through differential operation in the differential operational circuit 54 is expressed by the following Equation 27.

$$v18 = v16 - v17 = 2A_2 \cos(2\pi x/pt) \qquad \text{Equation 27}$$

A signal v19 obtained through multiplication in the multiplier 45 is expressed by the following Equation 28.

$$v19 = v15 \cdot v18 = A_2^2 \sin(4\pi x/pt) - 2A_2 B_2 \cos(2\pi x/pt) \qquad \text{Equation 28}$$

The signal v19 obtained through multiplication in the multiplier 45 contains the term of $\sin(4\pi x/pt)$, which represents a component capable of detecting a tracking error signal up to a frequency twice as high as the spatial cutoff frequency of the optical system in the same manner as the signal vt in the first embodiment. Other than the above-mentioned component, the signal v19 also contains the term of $-2A_2 B_2 \cos(2\pi x/pt)$ having the same frequency component as that of the signal v18 input to the multiplier 45. The above-mentioned component behaves as noise with respect to the tracking error signal.

The gain control amplifier 60 amplifies the input signal v18 while controlling the gain so that its output signal has a level for canceling the unnecessary signal components contained in the output v19 of the multiplier 45. An output of the gain control amplifier 60 is input to the differential operational circuit 56. The differential operational circuit 56 subtracts the noise component from the output v19 of the multiplier 45, and a signal output from the differential operational circuit 56 is sampled and held in the sample and hold circuit 46 to be generated as the tracking error signal vt.

When an optical data apparatus having the optical data storage medium and the tracking error signal detection method of the present embodiment is used, the tracking error signal can be obtained up to a frequency twice as high as the spatial cutoff frequency fc of the optical pickup head in the same manner as the optical data storage media of the first through tenth embodiments.

Twelfth Embodiment

Figure 20:
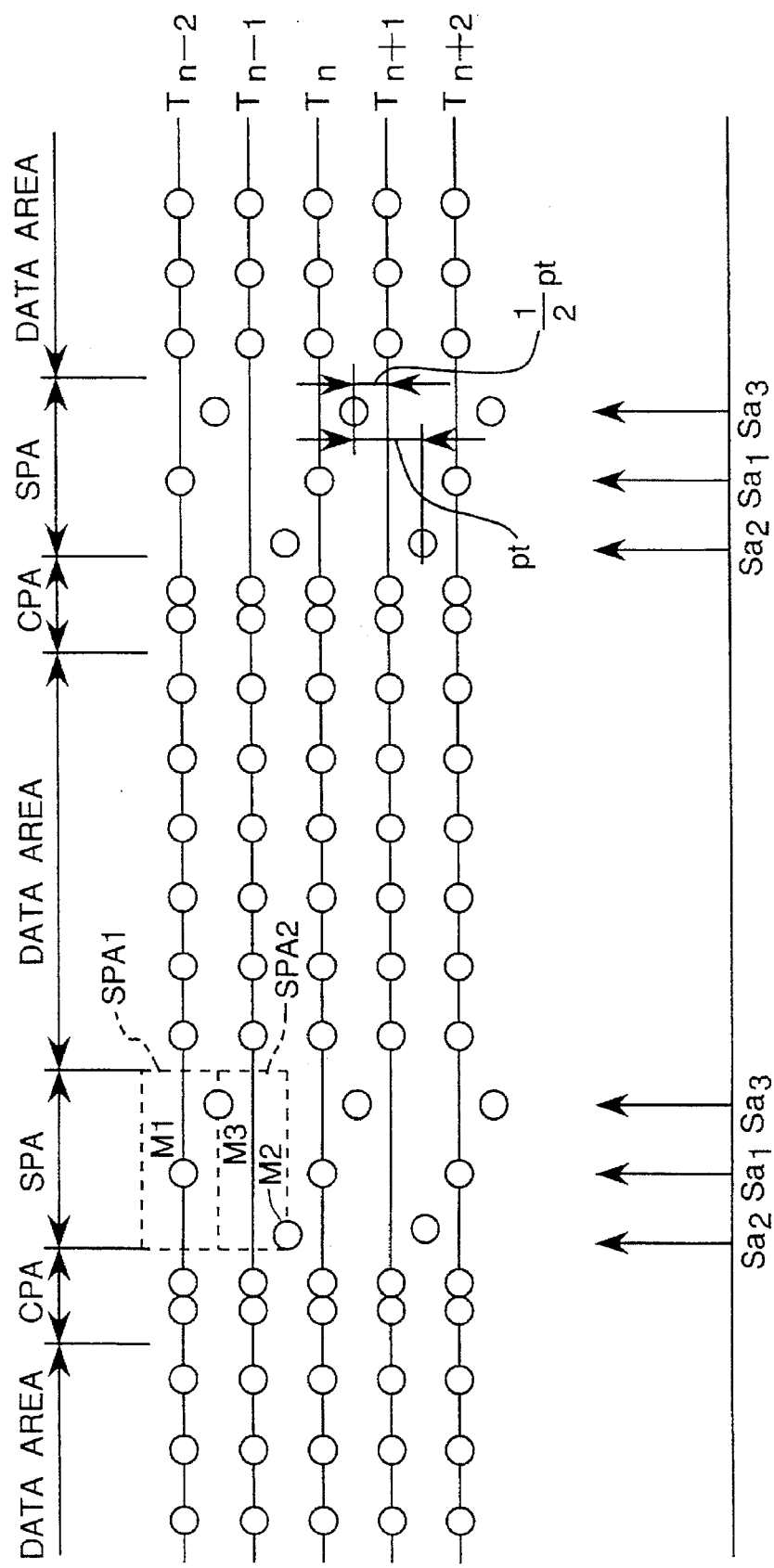
FIG. 20 is a schematic diagram of tracks on an optical data storage medium in accordance with another embodiment of the present invention.

FIG. 20 shows a schematic arrangement of tracks formed on an optical data storage medium in accordance with the twelfth embodiment of the present invention. The optical data storage medium of the present embodiment has almost the same construction as the optical data storage medium of the eleventh embodiment shown in FIG. 18. What differs is the fact that the first servo pattern area has a mark M1 formed on a track, and the second servo pattern area has two marks M2 and M3 formed in positions apart from the track by a distance of pt/2. The two marks M2 and M3 in the second servo pattern area are so arranged that they are arranged apart by a distance of pt in the direction perpendicular to the track. The marks are arranged so that the mark in the first servo pattern area and the space in the second servo pattern area are arranged adjacent to each other, while the space in the first servo pattern area and the mark in the second servo pattern area are arranged adjacent to each other.

The tracking error signal generator is allowed to have the construction as that of the eleventh embodiment, i.e., a circuit arrangement as shown in FIG. 19. The operation of the generator has been already described in detail on the eleventh embodiment, and therefore no description is provided therefor herein.

Assuming that the signals sampled and held in the sample and hold circuits 43, 93, and 94 are v15, v16, and v17 respectively and the beam which is emitted from the optical pickup head and converged on the optical data storage medium 31 has a displacement x with respect to the center of the track, the signals v15 through v17 are approximately expressed by the following Equations 29 through 31.

$$v15 = A_2 \cos(2\pi x/pt) + B_2 \quad \text{Equation 29}$$

$$v16 = A_2 \sin(2\pi x/pt) + B_2 \quad \text{Equation 30}$$

$$v17 = -A_2 \sin(2\pi x/pt) + B_2 \quad \text{Equation 31}$$

In Equations 29 through 31, $A_2$ represents an amplitude, while $B_2$ represents a DC component.

A signal v18 obtained through differential operation in the differential operational circuit 54 is expressed by the following Equation 32.

$$v18 = v16 - v17 = 2A_2 \sin(2\pi x/pt) \quad \text{Equation 32}$$

A signal v19 obtained through multiplication in the multiplier 45 is expressed by the following Equation 33.

$$v19 = v15 \cdot v18 = A_2^2 \sin(4\pi x/pt) - 2A_2 B_2 \sin(2\pi x/pt) \quad \text{Equation 33}$$

When an optical data apparatus having the optical data storage medium and the tracking error signal detection method of the present embodiment is used, the tracking error signal can be obtained up to a frequency twice as high as the spatial cutoff frequency fc of the optical pickup head in the same manner as the optical data storage media of the first through eleventh embodiments.

Thirteenth Embodiment

In the present embodiment, the same optical data apparatus as that of the first embodiment shown in FIG. 1 can be used. What differs from the first embodiment is in the fact that the tracking error signal generator 30 has a varied construction. The other components can be used utterly in the same manner as in the first embodiment.

Figure 21:
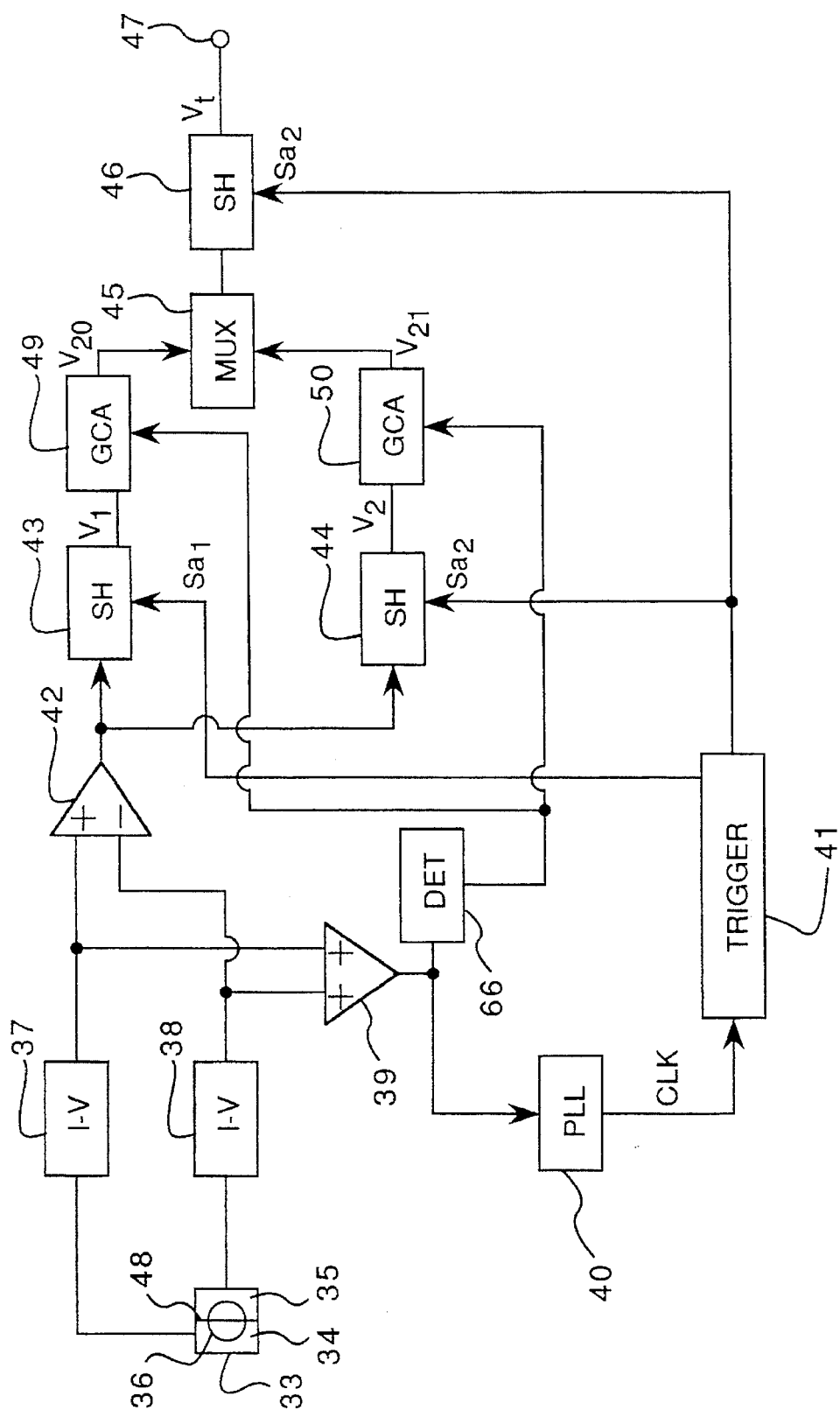
FIG. 21 is a block diagram of a tracking error signal detector circuit in accordance with another embodiment of the present invention.

FIG. 21 shows the construction of the tracking error signal generator. An optical data storage medium having a track construction as shown in FIG. 3 is used. The beam 36 from the optical pickup head 28 is received by the photodetector 33. Electric signals from the light-detecting sections 34 and 35 are subjected to current-to-voltage conversion respectively in the I–V converters 37 and 38. Output signals of the I–V converters 37 and 38 are transmitted to the differential operational circuit 42 and the adder 39. The signal subjected to addition in the adder 39 is input to the PLL circuit 40 and a light quantity detector 66.

The PLL circuit 40 generates a clock signal CLK synchronized with a signal obtained from the pattern recorded in the clock pattern area of the optical data storage medium 31. The clock signal CLK is transmitted to the trigger generator 41 to be used for generating timing signals Sa1 and Sa2 each representing a timing corresponding to the position of the pattern formed in the servo pattern area of the optical data storage medium.

The sample and hold circuits 43 and 44 sample and hold an output of the differential operational circuit 42 at the timing of the timing signals Sa1 and Sa2 respectively. The signals sampled and held in the sample and hold circuits 43 and 44 are input respectively to gain control circuits (GCAs) 49 and 50. The gain control circuits 49 and 50 control the gains so that output of each circuit has a constant amplitude even when the amplitude level of the input varies. The gain of each of the gain control circuits 49 and 50 is controlled by converting the signal added in the adder 39 into a control voltage in a light quantity detector 66.

Each of the gain control circuits 49 and 50 can be provided by a gain control circuit employing generally-known active and passive elements according to a method of controlling the gate voltage of a field-effect transistor or a method of controlling the voltage applied to a PIN diode. Output signals of the gain control circuits 49 and 50 are transmitted to the multiplier 45 to undergo multiplication, and then sampled and held in the sample and hold circuit 46 to be generated as the tracking error signal vt. The tracking error signal vt is output from the output terminal 47.

The signals v1 and v2 output from the sample and hold circuits 43 and 44 are the same as the signals v1 and v2 described in the first embodiment, the signals respectively expressed by Equations 4 and 5. Assuming that signals output from the gain control circuits 49 and 50 are v20 and v21 respectively, and that the beam which emitted from the optical pickup head 28 and converged on the optical data storage medium 31 has a displacement x with respect to the center of the track, the signals v20 and v21 have sine waveforms which are mutually different in phase by $\pi/2$ as approximately expressed by the following Equations 34 and 35.

$$v20 = A \sin(2\pi x/pt) \quad \text{Equation 34}$$

$$v21 = A \cos(2\pi x/pt) = A \sin(2\pi x/pt + \pi/2) \quad \text{Equation 35}$$

In Equations 34 and 35, A represents an amplitude. The amplitude A is kept constant by the gain control circuits 49 and 50 according to the tracking error signal detection method of the present embodiment even when the intensity of the beam emitted from the optical pickup head 28 varies or when the optical data storage medium is replaced by an optical data storage medium having a varied reflectance.

The tracking error signal vt is expressed by the following Equation 36.

$$vt = v20 \cdot v21 = A^2/2 \cdot \sin(4\pi x/pt) \quad \text{Equation 36}$$

The amplitude of the tracking error signal vt is proportional to the square of the amplitude A of the signal input to the multiplier 45 as apparent from Equation 21. According to the tracking error signal detection method of the present embodiment, the amplitude A is kept constant by the gain control circuits 49 and 50 according to the tracking error signal detection method of the present embodiment even when the intensity of the beam emitted from the optical pickup head 28 varies or when the optical data storage medium is replaced by an optical data storage medium having a varied reflectance. Therefore, the amplitude of the tracking error signal vt is kept constant. Since the amplitude of the tracking error signal is kept constant when the tracking error signal is detected by the tracking error signal detection method of the present embodiment, the tracking control system does not oscillate to achieve a stable tracking control.

Fourteenth Embodiment

In the present embodiment, the same optical data apparatus as that of the first embodiment shown in FIG. 1 can be used. What differs is the fact that the tracking error signal generator 30 has a varied construction. The other components can be used utterly in the same manner as in the first embodiment.

Figure 22:
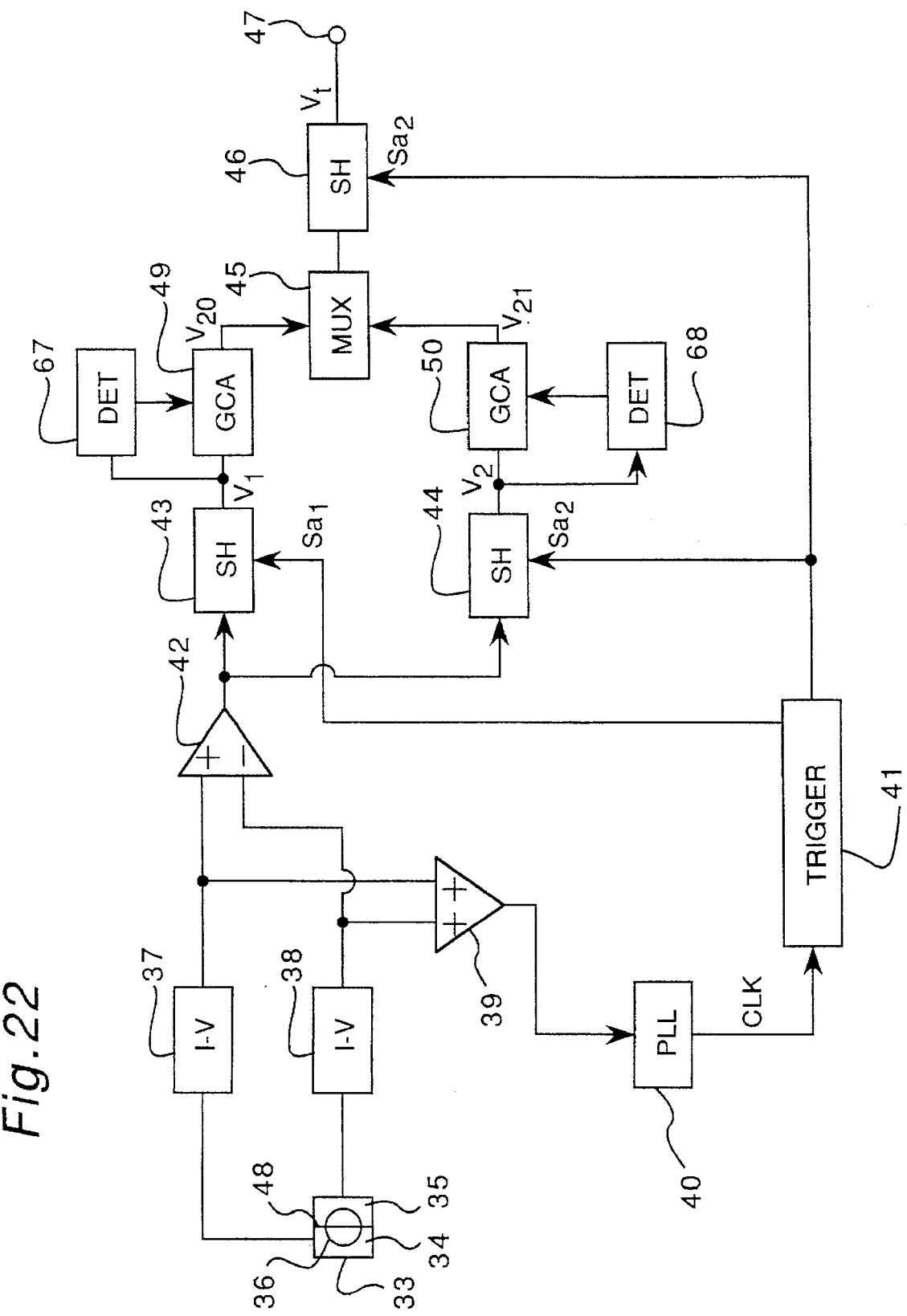
FIG. 22 is a block diagram of a tracking error signal detector circuit in accordance with another embodiment of the present invention.

FIG. 22 shows the construction of the tracking error signal generator.

The beam 36 from the optical pickup head 28 is received by the photodetector 33. Electric signals from the light-detecting sections 34 and 35 are subjected to current-to-voltage conversion respectively in the I–V converter circuits 37 and 38. Timing signals Sa1 and Sa2 are generated in the same signal processing manner as in the first embodiment or the thirteenth embodiment. The sample and hold circuits 43 and 44 sample and hold an output of the differential operational circuit 42 at the timing of the timing signals Sa1 and Sa2. The signals sampled and held in the sample and hold circuits 43 and 44 are input respectively to the gain control circuits 49 and 50.

The gain control circuits 49 and 50 control the gains so that output of each circuit has a constant amplitude even when the amplitude of the input varies. The gains of the gain control circuits 49 and 50 are controlled by converting the output signals of the sample and hold circuits 43 and 44 into control voltages in amplitude detectors 67 and 68. By making the amplitude detector circuits 67 and 68 have a construction such that the amplitudes of first outputs of the sample and hold circuits 43 and 44 are detected and held when the optical data storage medium is changed, a signal having a constant amplitude can be input to the multiplier 45 even when an optical data storage medium having a varied modulation ratio depending on the depth of the groove or pit of the optical data storage medium is used or when an optical data storage medium having a varied reflectance is used. The gain control circuits 49 and 50 can be each provided by a gain control circuit employing generally-known active and passive elements according to a method of controlling the gate voltage of a field-effect transistor or a method of controlling the voltage applied to a PIN diode. Outputs of the gain control circuits 49 and 50 are transmitted to the multiplier 45 to undergo multiplication, and then sampled and held in the sample and hold circuit 46 to be generated as the tracking error signal vt. The tracking error signal vt is output from the output terminal 47.

The amplitude of the tracking error signal output from the multiplier circuit 45 is proportional to the square of the amplitude A of the signal input to the multiplier circuit 45. According to the tracking error signal detection method of the present embodiment, a signal having a constant amplitude can be input to the multiplier 45 even when an optical data storage medium having a varied modulation ratio depending on the depth of the groove or pit of the optical data storage medium is used or when an optical data storage medium having a varied reflectance is used. Therefore, the amplitude of the tracking error signal is kept constant. Since the amplitude of the tracking error signal is kept constant when the tracking error signal is detected by the tracking error signal detection method of the present embodiment, the tracking control system does not oscillate to achieve a stable tracking control.

Fifteenth Embodiment

In the present embodiment, the same optical data apparatus as that of the first embodiment shown in FIG. 1 can be used. What differs is the fact that the tracking error signal generator 30 has a varied construction. The other components can be used utterly in the same manner as in the first embodiment.

Figure 23:
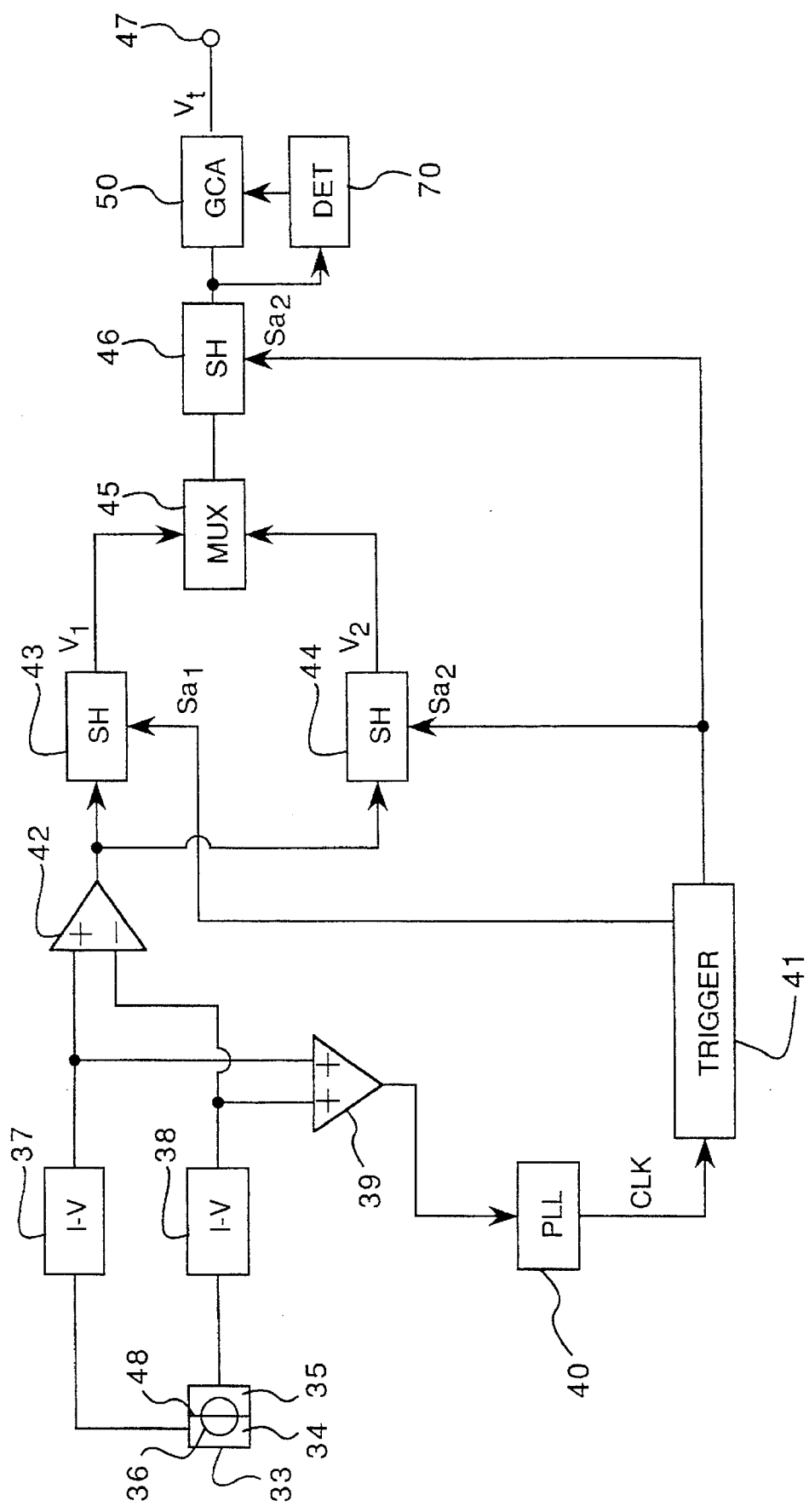
FIG. 23 is a block diagram of a tracking error signal detector circuit in accordance with another embodiment of the present invention.

FIG. 23 shows the construction of the tracking error signal generator.

The beam 36 from the optical pickup head 28 is received by the photodetector 33. Electric signals from the light-detecting sections 34 and 35 are subjected to current-to-voltage conversion respectively in the I–V converters 37 and 38. Timing signals Sa1 and Sa2 are generated in the same signal processing manner as in the first embodiment, thirteenth embodiment, or the fourteenth embodiment. The sample and hold circuits 43 and 44 sample and hold the output signal of the differential operational circuit 42 at the timing of the timing signals Sa1 and Sa2 respectively. The signals sampled and held in the sample and hold circuits 43 and 44 are transmitted to the multiplier 45 to undergo multiplication, and then sampled and held in the sample and hold circuit 46. A signal output from the sample and hold circuit 46 is input to the gain control circuit 50. The gain control circuit 50 controls the gain so that its output has a constant amplitude even when the amplitude of the input varies. The gain of the gain control circuit 50 is controlled by converting an output signal of the sample and hold circuits 46 into a control voltage in an amplitude detector (DET) 70. By making the amplitude detector 70 have a construction such that the amplitude of the first output of the sample and hold circuit 46 is detected and held when the optical data storage medium is changed, a signal having a constant amplitude can be output from the gain control circuit 69 even when an optical data storage medium having a varied modulation ratio depending on the depth of the groove or pit of the optical data storage medium is used or when an optical data storage medium having a varied reflectance is used. The output of the gain control circuit 50 is used as the tracking error signal vt.

The amplitude of the signal output from the multiplier 45 is proportional to the square of the amplitude A of the signal input to the multiplier 45. According to the tracking error signal detection method of the present embodiment, a signal having a constant amplitude can be output from the output terminal 47 even when an optical data storage medium having a varied modulation ratio depending on the depth of the groove or pit of the optical data storage medium is used or when an optical data storage medium having a varied reflectance is used. Therefore, the amplitude of the tracking error signal is kept constant. Since the amplitude of the tracking error signal is kept constant when the tracking error signal is detected by the tracking error signal detection method of the present embodiment, the tracking control system does not oscillate to achieve a stable tracking control in the same manner as in the thirteenth embodiment and the fourteenth embodiment.

According to the present invention as understood from the descriptions for the thirteenth embodiment through the fifteenth embodiment, a tracking error signal having a stabilized amplitude can be obtained by providing a gain control circuit at the input or output side of the multiplier circuit in an optical data apparatus for detecting a tracking error signal through multiplication to keep constant the amplitude of the tracking error signal.

Sixteenth Embodiment

In the present embodiment, the same optical data apparatus as that of the first embodiment shown in FIG. 1 can be used. What differs is the fact that the tracking error signal generator circuit 30 has a varied construction. The other components can be used utterly in the same manner as in the first embodiment.

Figure 24:
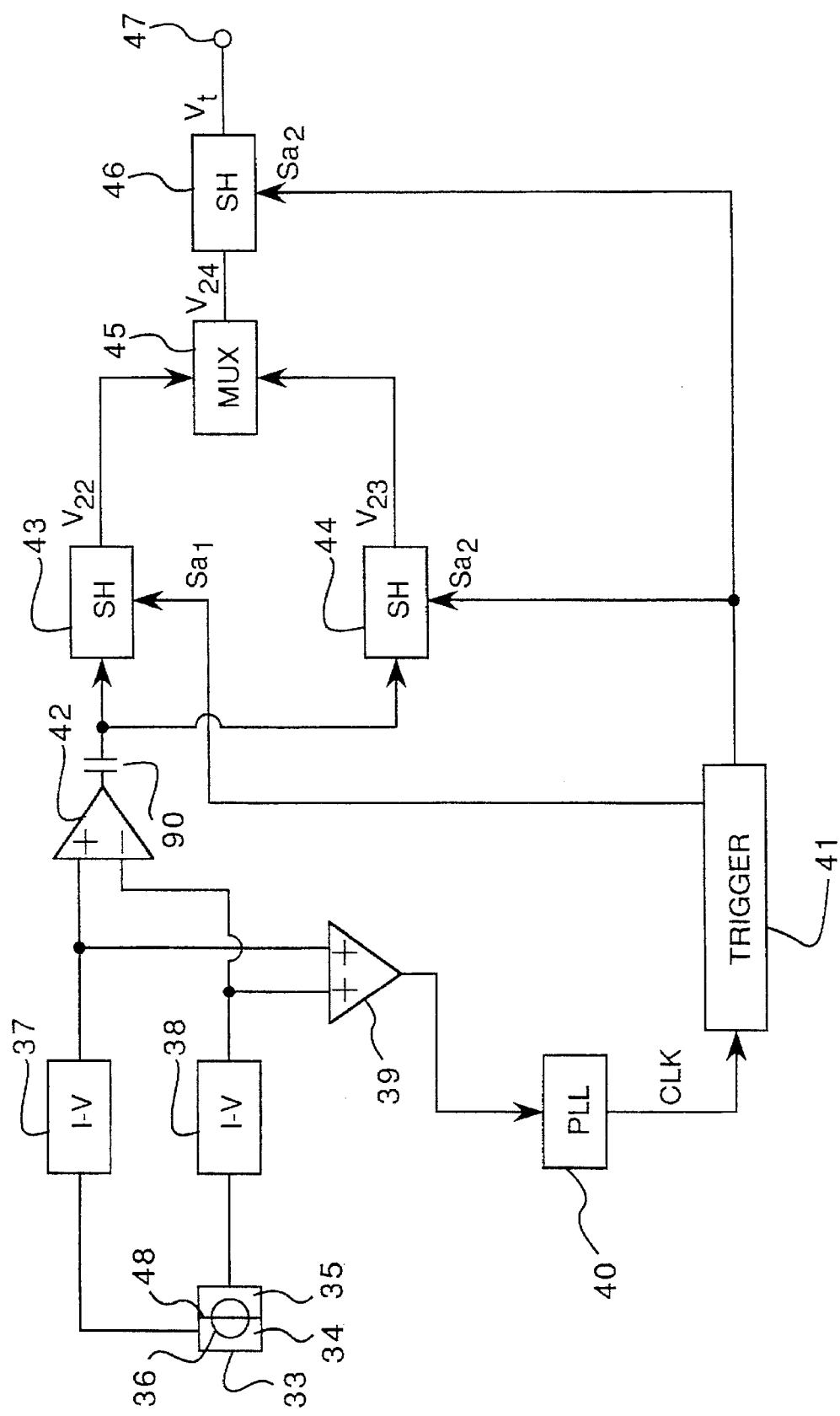
FIG. 24 is a block diagram of a tracking error signal detector circuit in accordance with another embodiment of the present invention.
Figure 25:
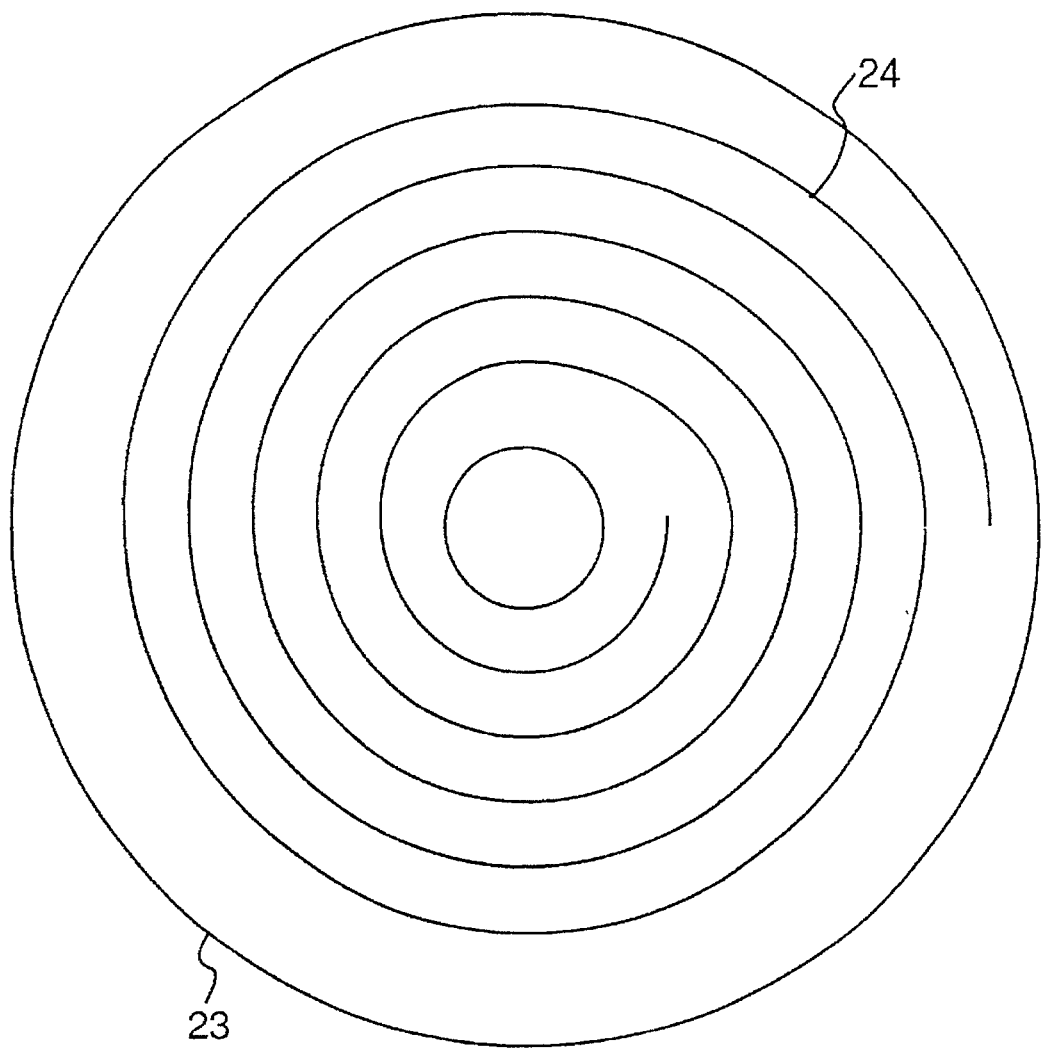
FIG. 25 is a schematic diagram of a conventional optical data storage medium.
Figure 26:
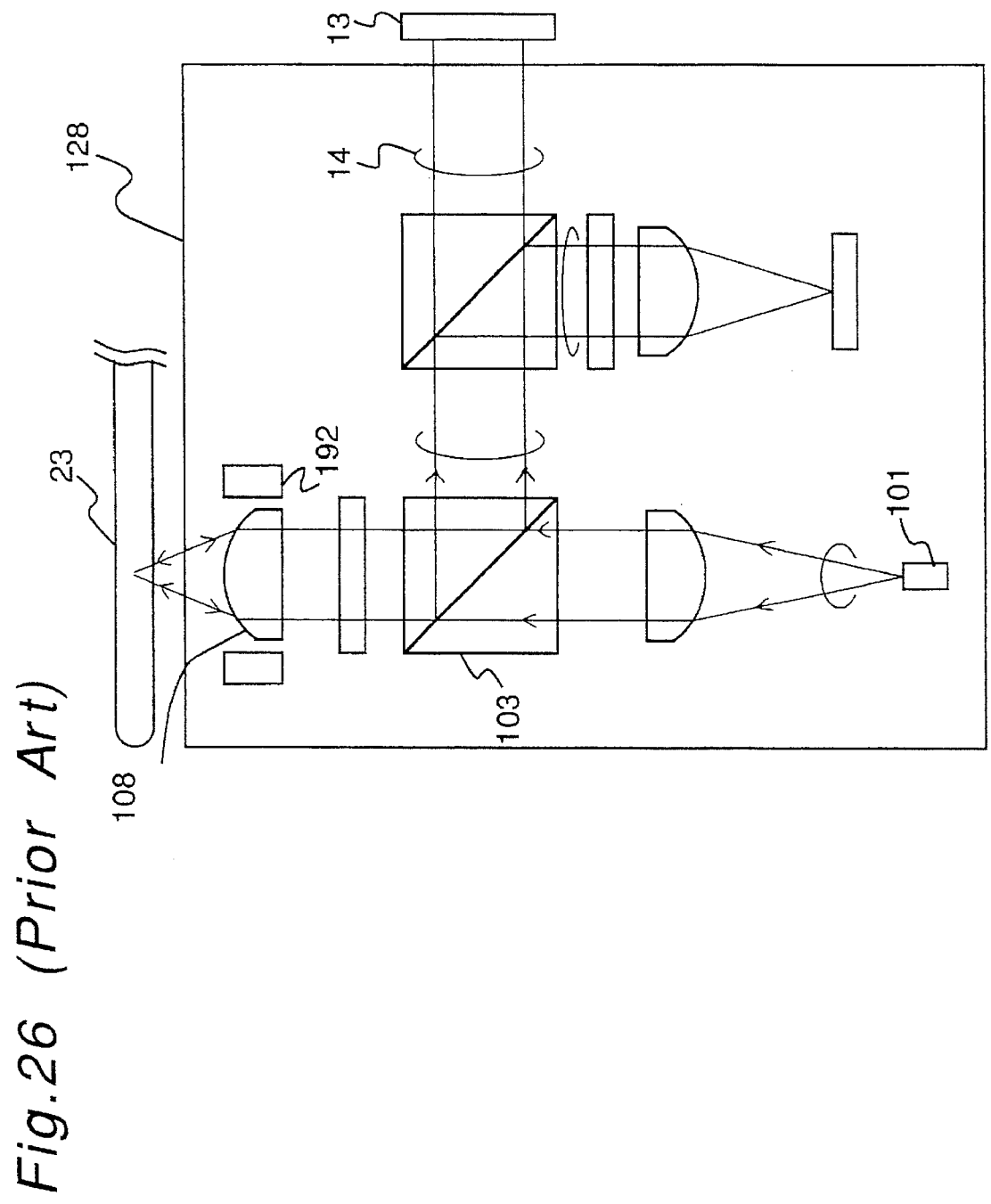
FIG. 26 is a schematic diagram of a conventional optical pickup head.
Figure 27:
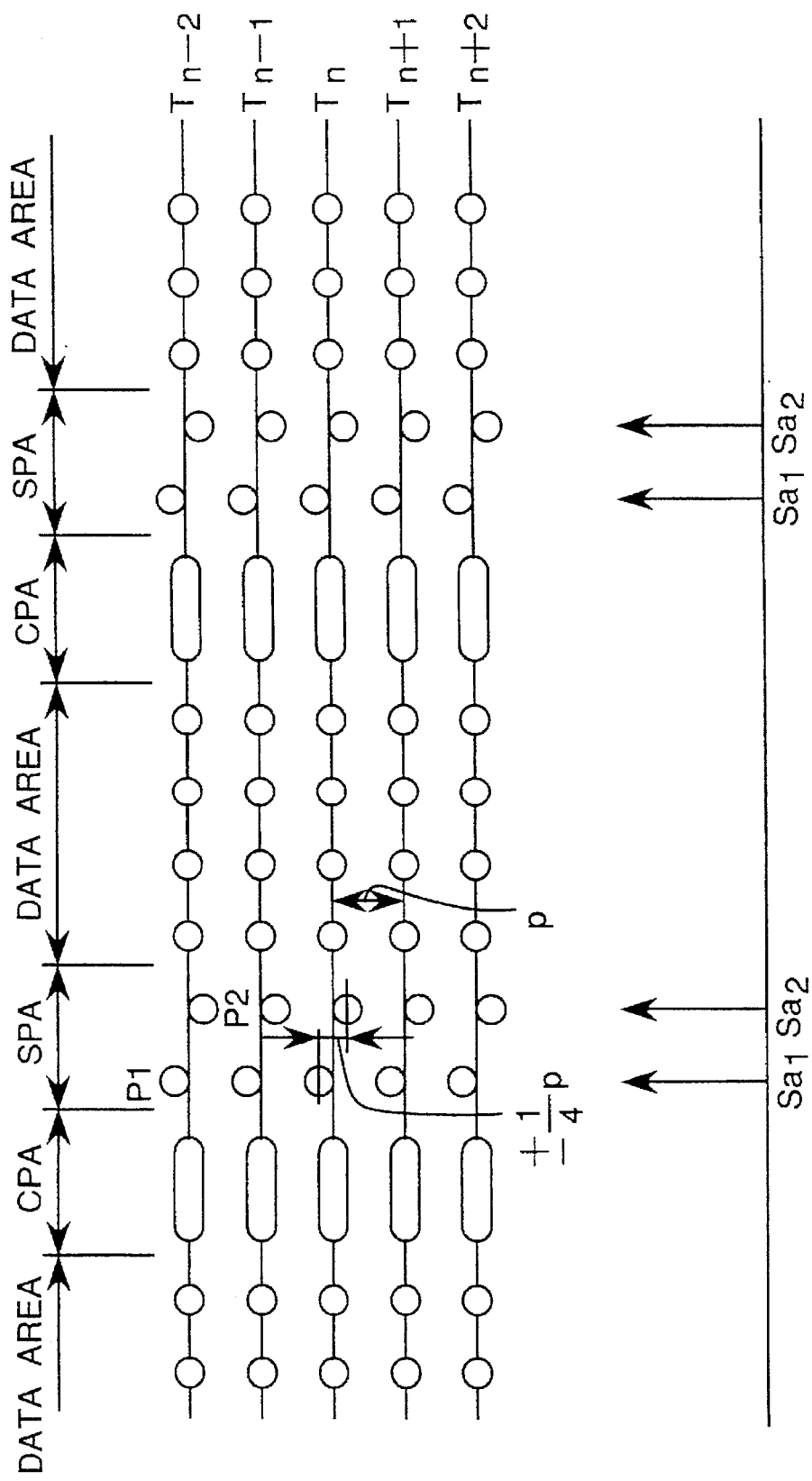
FIG. 27 is a schematic diagram of tracks on a conventional optical data storage medium.
Figure 28:
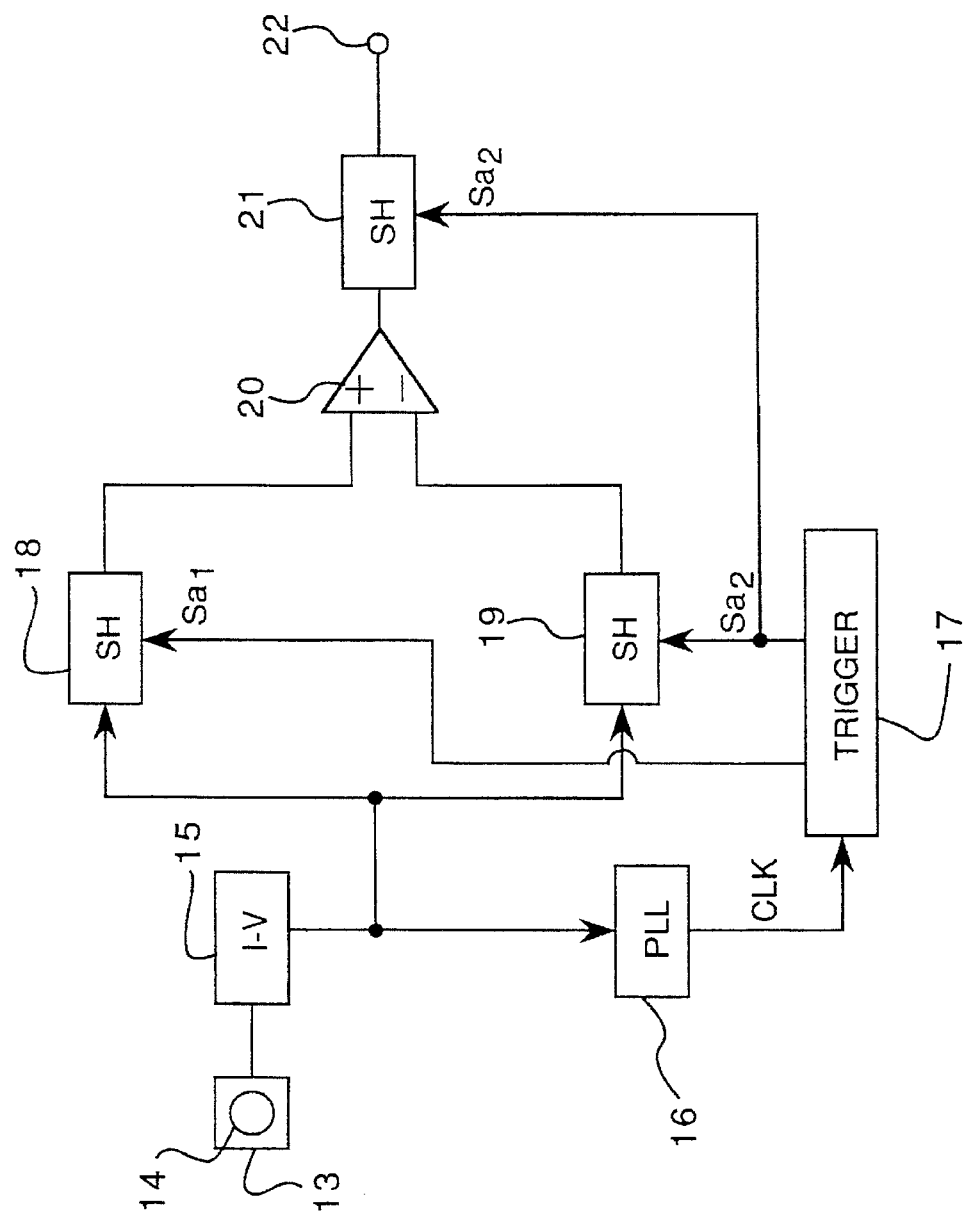
FIG. 28 is a schematic diagram of a circuit for detecting a tracking error signal by means of a conventional optical data storage medium.

FIG. 24 shows the construction of the tracking error signal generator. The beam 36 from the optical pickup head 28 is received by the photodetector 33. Electric signals from the light-detecting sections 34 and 35 are subjected to current-to-voltage conversion respectively in I–V converter circuits 37 and 38. Output signals of the I–V converter circuits 37 and 38 are transmitted to the differential operational circuit 42 and the adder 39. The signal added through the adder 39 is input to the PLL circuit 40. The PLL circuit 40 generates a clock signal CLK synchronized with a signal obtained from the pattern recorded in the clock pattern area of the optical data storage medium. The clock signal CLK is transmitted to the trigger generator 41 to be used for generating timing signals Sa1 and Sa2 each representing a timing corresponding to the position of the pattern formed in the servo pattern area of the optical data storage medium.

The sample and hold circuits 43 and 44 sample and hold a signal input at the timing of the timing signals Sa1 and Sa2. A DC component in a signal output from the differential operational circuit 42 is cut off by means of a capacitor 90, and the resulting signal is transmitted to the sample and hold circuits 43 and 44. Output signals v22 and v23 of the sample and hold circuits 43 and 44 are transmitted to the multiplier 45 to undergo multiplication to obtain an output signal v24 and then sampled and held in the sample and hold circuit 46 to be generated as the tracking error signal vt. The tracking error signal vt is output from the output terminal 47.

The signals v22 and v23 sampled and held at the timing of the timing signals Sa1 and Sa2 idealistically have no DC component when the beam output from the optical pickup head 28 and converged on the optical data storage medium 31 has a displacement x with respect to the center of the track, and the signals have sine waveforms which are different in phase by $\pi/2$ as approximately expressed by the following Equations 37 and 38.

$$v22 = A_1 \sin(2\pi x/pt) \quad \text{Equation 37}$$

$$v23 = A_1 \cos(2\pi x/pt) = A_1 \sin(2\pi x/pt + \pi/2) \quad \text{Equation 38}$$

In Equations 37 and 38, A represents an amplitude. The signals v22 and v23 expressed by Equations 37 and 38 are the same as the signals v1 and v2 expressed by Equations 4 and 5.

If the capacitor 90 for cutting off the DC component is not provided at the output side of the differential operational circuit 42, the two signals v22 and v23 have different amplitudes and contain DC components as expressed by the following Equations 39 and 40 when the photodetector 33 is inappropriately arranged and the beam 36 is not incident on the center portion of the photodetector 33 or when the beam converged on the optical data storage medium has a comatic aberration.

$$v22 = A_5 \sin(2\pi x/pt) + B_5 \quad \text{Equation 39}$$

$$v23 = A_6 \cos(2\pi x/pt) + B_6 \quad \text{Equation 40}$$

In Equations 39 and 40, $A_5$ and $A_6$ represent amplitudes, while $B_5$ and $B_6$ represent DC components.

A signal v24 obtained through multiplication of the signals v22 and v23 containing DC components as expressed by the Equations 39 and 40 input to the multiplier 45 becomes a signal having noise and a DC offset component as expressed by the following Equation 41.

$$v24 = v22 \cdot v23 = A_5 \cdot A_6/2 \cdot \sin(4\pi x/pt) - A_5 B_6 \sin(2\pi x/pt) - A_6 B_5 \cos(2\pi x/pt) + B_5 B_6 \quad \text{Equation 41}$$

Since the signal output from the differential operational circuit 42 is input to the sample and hold circuits 43 and 44 with its DC component cut off by the capacitor 90, the signals v22 and v23 input to the multiplier 45 contain no DC component as expressed by Equations 37 and 38 when the photodetector 33 has an inappropriate relation in position with the beam 36 received by the photodetector 33 or when the beam converged on the optical data storage medium 31 has a comatic aberration. Therefore, the signal v24 obtained through multiplication becomes a signal having no noise nor offset component as expressed by the following Equation 42.

$$v24 = v22 \cdot v23 = A_5 \cdot A_6/2 \cdot \sin(4\pi x/pt) \quad \text{Equation 42}$$

When the tracking error signal is detected by the tracking error signal detection method of the present embodiment, the resulting signal has no noise nor offset component to allow a more stable tracking control to be achieved as compared with the first embodiment.

It is noted that the first embodiment through sixteenth embodiment of the present invention have been described with the optical data apparatus shown in FIG. 1 as a base for better understanding. The present invention relates to a tracking error signal detection method and optical data apparatus appropriate for the method, and does absolutely not depend on any focus error signal detection method nor on the construction of the optical pickup head. For instance, the focus error signal detection methods disclosed in the U.S. Pat. Nos. 3,876,841 and 4,006,293 are also applicable to the present invention.

It is to be noted here that the optical data storage medium may have further modified servo pattern area, where the servo pattern area includes a first servo pattern area (SPA1) and a second servo pattern area (SPA2), the first servo pattern area having a combination of a mark (M1) and a space, the second servo pattern area having a space without any mark, the first servo pattern area and the second servo pattern area arranged alternately on a virtual radial line intersecting the track at right angles.

Moreover, it is to be noted that the optical data storage medium may have the mark formed in the servo pattern area having a width greater than the width of the mark formed in the data recording area.

In addition, the optical data storage medium may have a construction such that a track on which only the first servo pattern area is formed in the servo pattern area and a track on which only the second servo pattern area is formed in the servo pattern area are alternately arranged.

In addition, the optical data storage medium may have another construction such that the first servo pattern area and the second servo pattern area are alternately arranged in the servo pattern areas of an identical track.

It is to be noted here that the optical data storage medium of the present invention preferably has a construction such that 100 to 3,000 in number of the servo pattern areas are formed on one track.

It should be apparently understood from the description provided hereinbefore that the construction of the optical system is absolutely not restricted by the other components so long as the optical system can obtain the beam 36 for detecting the tracking error signal and includes the photodetector 33 or 51. Therefore, although the tracking error signal detection as well as the recording and reproduction of data are executed utterly optically in the present invention, there is no problem when the tracking error signal detection is executed optically and the recording and reproduction of data on the data area is executed by means of a magnetic head. Therefore, the present invention can be applied to the above case. For instance, different types of heads may be used in the case of magneto-optic data recording, magnetic data recording, or the like.

Although the output from the tracking error signal generator is directly connected to the actuator 92 for tracking control for better understanding in FIG. 1, an amplifier is of course allowed to be incorporated when the output must be amplified to a level enough for driving the actuator for tracking control.

Any optical data apparatus of the present invention has the essential feature that a tracking error signal is generated through multiplication of the input signals in a multiplier and the resulting tracking error signal has a frequency twice as high as the frequency of the signal input to the multiplier. Therefore, no problem occurs when any other parts are subjected to a variety of modifications.

Furthermore, as understood from the descriptions for the first embodiment through sixteenth embodiment, a tracking error signal of which cycle is identical to the track pitch can be obtained as shown in FIG. 5 (c) when an optical data storage medium and a tracking error signal detection method of the present invention are used.

In other words, a tracking error signal can be detected without inverting the polarity of the tracking error signal nor incorporating any special processing to the track of the optical data storage medium. Therefore, for instance, when a desired track is searched, a stable search of the desired track can be promptly achieved.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An optical data apparatus having an optical pickup head for applying a laser beam onto an optical data storage medium based on a focus error signal generated by a focus error signal generating section and on a tracking error signal generated by a tracking error signal generating section, the optical pickup head comprising:
   a laser beam source which emits a coherent beam or a quasi-monochromatic beam;
   a light-converging optical system which receives the beam emitted from the laser beam source to converge the beam on an infinitesimal spot on the optical data storage medium;
   beam splitting means which receives the beam reflected and diffracted on the optical data storage medium to split the beam;
   a photodetector means which receives the beam split by the beam splitting means to output a photoelectric current;
   focus control means which controls the focus of the converged beam so that the beam emitted from the laser beam source is converged on a desired position on the optical data storage medium, the focus control means controlled by the signal output from the focus error signal generating section; and
   tracking control means which controls the position of the converged beam so that the beam emitted from the laser beam source is converged on the desired position on the optical data storage medium, said tracking control means controlled by the signal output from the tracking error signal generating section, the focus error signal generating section comprising:
   an operational amplifier section which receives an electric signal output from the photodetector means to execute an operation for generating a focus error signal and amplify the focus error signal to a level allowing the focus control means of the optical pickup head to be controlled, and the tracking error signal generating section comprising:
   sample and hold means for sampling and holding the electric signal output from the photodetector means to form not less than two signals sampled at different times;
   timing signal generating section for generating signals representing the signal sampling and holding timing of the sample and hold means;
   multiplication means for multiplying the two signals output from the sample and hold means to generate a tracking error signal, the resulting tracking error signal having a frequency twice as high as the frequency of each signal input to the multiplication means;
   gain control means for controlling the gain so that the tracking error signal has a specified amplitude, wherein the gain control means is arranged at the input side of the multiplication means; and
   a plurality of amplitude detection means for detecting the amplitude of each of a plurality of signals input to the multiplication means, and a plurality of gain control means capable of controlling its gain so that each of the plural signals input to the multiplication means has a specified amplitude, the gain of each of the plural gain control means controlled based on a signal detected by each of the plural amplitude detection means.

2. The optical data apparatus as claimed in claim 1, wherein the detection of the tracking error signal as well as recording, erasing, and reproduction of data are executed by means of the optical pickup head.

3. The optical data apparatus as claimed in claim 1, wherein the apparatus further comprises a magnetic head which forms a magnetic field in the vicinity of the optical data storage medium, the detection of the tracking error signal is executed by means of the optical pickup head, while recording, erasing, or regeneration of data is executed by means of the magnetic head.

4. An optical data apparatus having an optical pickup head for applying a laser beam onto an optical data storage medium based on a focus error signal generated by a focus error signal generating section and on a tracking error signal generated by a tracking error signal generating section, the optical pickup head comprising:
- a laser beam source which emits a coherent beam or a quasi-monochromatic beam;
- a light-converging optical system which receives the beam emitted from the laser beam source to converge the beam on an infinitesimal spot on the optical data storage medium;
- beam splitting means which receives the beam reflected and diffracted on the optical data storage medium to split the beam;
- a photodetector means which receives the beam split by the beam splitting means to output a photoelectric current;
- focus control means which controls the focus of the converged beam so that the beam emitted from the laser beam source is converged on a desired position on the optical data storage medium, the focus control means controlled by the signal output from the focus error signal generating section; and
- tracking control means which controls the position of the converged beam so that the beam emitted from the laser beam source is converged on the desired position on the optical data storage medium, said tracking control means controlled by the signal output from the tracking error signal generating section, the focus error signal generating section comprising:
- an operational amplifier section which receives an electric signal output from the photodetector means to execute an operation for generating a focus error signal and amplify the focus error signal to a level allowing the focus control means of the optical pickup head to be controlled, and the tracking error signal generating section comprising:
- sample and hold means for sampling and holding the electric signal output from the photodetector means to form not less than two signals sampled at different times;
- timing signal generating section for generating signals representing the signal sampling and holding timing of the sample and hold means;
- multiplication means for multiplying the two signals output from the sample and hold means to generate a tracking error signal, the resulting tracking error signal having a frequency twice as high as the frequency of each signal input to the multiplication means;
- gain control means for controlling the gain so that the tracking error signal has a specified amplitude, wherein the gain control means is arranged at the output side of the multiplication means; and
- amplitude detection means for detecting the amplitude of a signal output from the multiplication means, and gain control means for controlling its gain so that the signal output from the multiplication means has a desired amplitude, the gain of the gain control means controlled based on a signal detected by the amplitude detection means.

5. The optical data apparatus as claimed in claim 4, wherein the detection of the tracking error signal as well as recording, erasing, and reproduction of data are executed by means of the optical pickup head.

6. The optical data apparatus as claimed in claim 4, wherein the apparatus further comprises a magnetic head which forms a magnetic field in the vicinity of the optical data storage medium, the detection of the tracking error signal is executed by means of the optical pickup head, while recording, erasing, or regeneration of data is executed by means of the magnetic head.

7. An optical data apparatus having an optical pickup head for applying a laser beam onto an optical data storage medium based on a focus error signal generated by a focus error signal generating section and on a tracking error signal generated by a tracking error signal generating section, the optical pickup head comprising:
- a laser beam source which emits a coherent beam or a quasi-monochromatic beam;
- a light-converging optical system which receives the beam emitted from the laser beam source to converge the beam on an infinitesimal spot on the optical data storage medium;
- beam splitting means which receives the beam reflected and diffracted on the optical data storage medium to split the beam;
- a photodetector means which receives the beam split by the beam splitting means to output a photoelectric current;
- focus control means which controls the focus of the converged beam so that the beam emitted from the laser beam source is converged on a desired position on the optical data storage medium, the focus control means controlled by the signal output from the focus error signal generating section; and
- tracking control means which controls the position of the converged beam so that the beam emitted from the laser beam source is converged on the desired position on the optical data storage medium, said tracking control means controlled by the signal output from the tracking error signal generating section, the focus error signal generating section comprising:
- an operational amplifier section which receives an electric signal output from the photodetector means to execute an operation for generating a focus error signal and amplify the focus error signal to a level allowing the focus control means of the optical pickup head to be controlled, and the tracking error signal generating section comprising:
- sample and hold means for sampling and holding the electric signal output from the photodetector means to form not less than two signals sampled at different times;
- timing signal generating section for generating signals representing the signal sampling and holding timing of the sample and hold means;
- multiplication means for multiplying the two signals output from the sample and hold means to generate a tracking error signal, the resulting tracking error signal having a frequency twice as high as the frequency of each signal input to the multiplication means; and
- direct-current signal cutoff means for cutting off a direct-current component contained in the signal input to the multiplication means.

8. The optical data apparatus as claimed in claim 7, wherein the detection of the tracking error signal as well as recording, erasing, and reproduction of data are executed by means of the optical pickup head.

9. The optical data apparatus as claimed in claim 7, wherein the apparatus further comprises a magnetic head which forms a magnetic field in the vicinity of the optical data storage medium, the detection of the tracking error signal is executed by means of the optical pickup head, while recording, erasing, or regeneration of data is executed by means of the magnetic head.

10. An optical data apparatus having an optical pickup head for applying a laser beam onto an optical data storage medium based on a focus error signal generated by a focus error signal generating section and on a tracking error signal generated by a tracking error signal generating section, the optical pickup head comprising:
- a laser beam source which emits a coherent beam or a quasi-monochromatic beam;

a light-converging optical system which receives the beam emitted from the laser beam source to converge the beam on an infinitesimal spot on the optical data storage medium;

beam splitting means which receives the beam reflected and diffracted on the optical data storage medium to split the beam;

a photodetector means which receives the beam split by the beam splitting means to output a photoelectric current;

focus control means which controls the focus of the converged beam so that the beam emitted from the laser beam source is converged on a desired position on the optical data storage medium, the focus control means controlled by the signal output from the focus error signal generating section; and tracking control means which controls the position of the converged beam so that the beam emitted from the laser beam source is converged on the desired position on the optical data storage medium, said tracking control means controlled by the signal output from the tracking error signal generating section, the focus error signal generating section comprising:

an operational amplifier section which receives an electric signal output from the photodetector means to execute an operation for generating a focus error signal and amplify the focus error signal to a level allowing the focus control means of the optical pickup head to be controlled, and the tracking error signal generating section comprising:

sample and hold means for sampling and holding the electric signal output from the photodetector means to form not less than two signals sampled at different times;

timing signal generating section for generating signals representing the signal sampling and holding timing of the sample and hold means;

multiplication means for multiplying the two signals output from the sample and hold means to generate a tracking error signal, the resulting tracking error signal having a frequency twice as high as the frequency of each signal input to the multiplication means; and subtracting means which is arranged at the output side of the multiplication means and operates to reduce the direct-current component contained in the signal output from the multiplication means or a component having the same frequency as the frequency of the signal input to the multiplication means by subtracting from the signal output from the multiplication means the direct-current component or the signal having the same frequency as the frequency of the signal input to the multiplication means.

11. The optical data apparatus as claimed in claim 10, wherein the detection of the tracking error signal as well as recording, erasing, and reproduction of data are executed by means of the optical pickup head.

12. The optical data apparatus as claimed in claim 10, wherein the apparatus further comprises a magnetic head which forms a magnetic field in the vicinity of the optical data storage medium, the detection of the tracking error signal is executed by means of the optical pickup head, while recording, erasing, or regeneration of data is executed by means of the magnetic head.

13. An optical data apparatus having an optical pickup head for applying a laser beam onto an optical data storage medium based on a focus error signal generated by a focus error signal generating section and on a tracking error signal generated by a tracking error signal generating section, the optical pickup head comprising:

a laser beam source which emits a coherent beam or a quasi-monochromatic beam;

a light-converging optical system which receives the beam emitted from the laser beam source to converge the beam on an infinitesimal spot on the optical data storage medium;

beam splitting means which receives the beam reflected and diffracted on the optical data storage medium to split the beam;

a photodetector means which receives the beam split by the beam splitting means to output a photoelectric current;

focus control means which controls the focus of the converged beam so that the beam emitted from the laser beam source is converged on a desired position on the optical data storage medium, the focus control means controlled by the signal output from the focus error signal generating section; and tracking control means which controls the position of the converged beam so that the beam emitted from the laser beam source is converged on the desired position on the optical data storage medium, said tracking control means controlled by the signal output from the tracking error signal generating section, the focus error signal generating section comprising:

an operational amplifier section which receives an electric signal output from the photodetector means to execute an operation for generating a focus error signal and amplify the focus error signal to a level allowing the focus control means of the optical pickup head to be controlled, and the tracking error signal generating section comprising:

sample and hold means for sampling and holding the electric signal output from the photodetector means to form not less than two signals sampled at different times;

timing signal generating section for generating signals representing the signal sampling and holding timing of the sample and hold means;

multiplication means for multiplying the two signals output from the sample and hold means to generate a tracking error signal, the resulting tracking error signal having a frequency twice as high as the frequency of each signal input to the multiplication means;

subtracting means which is arranged at the input side of the multiplication means and operates to reduce the direct-current component contained in the signal input to the multiplication means; and wherein the beam reflected on the optical data storage medium is received by the photodetector, the signal output from the photodetector is input to an alternating-current cutoff means to be used for detecting a direct-current signal proportional to the quantity of light incident on the photodetector, and the direct-current signal is used to subtract the direct-current component from the signal output from the multiplication means.

14. The optical data apparatus as claimed in claim 13, wherein the detection of the tracking error signal as well as recording, erasing, and reproduction of data are executed by means of the optical pickup head.

15. The optical data apparatus as claimed in claim 13, wherein the apparatus further comprises a magnetic head which forms a magnetic field in the vicinity of the optical data storage medium, the detection of the tracking error signal is executed by means of the optical pickup head, while recording, erasing, or regeneration of data is executed by means of the magnetic head.

* * * * *